(12) United States Patent
Hansen

(10) Patent No.: US 9,019,535 B1
(45) Date of Patent: Apr. 28, 2015

(54) SECURE MOBILE PRINTING FROM A THIRD-PARTY DEVICE

(71) Applicant: BreezyPrint Corporation, Oakland, CA (US)

(72) Inventor: Jared Hansen, Oakland, CA (US)

(73) Assignee: BreezyPrint Corporation, Oakland, CA (US)

( * ) Notice: Subject to any disclaimer, the term of this patent is extended or adjusted under 35 U.S.C. 154(b) by 0 days.

(21) Appl. No.: 13/707,577

(22) Filed: Dec. 6, 2012

Related U.S. Application Data

(63) Continuation-in-part of application No. 12/764,287, filed on Apr. 21, 2010.

(60) Provisional application No. 61/567,191, filed on Dec. 6, 2011, provisional application No. 61/185,541, filed on Jun. 9, 2009.

(51) Int. Cl.
*G06F 15/00* (2006.01)
*G06K 1/00* (2006.01)
*G06F 3/12* (2006.01)

(52) U.S. Cl.
CPC .................................... *G06F 3/1296* (2013.01)

(58) Field of Classification Search
None
See application file for complete search history.

(56) References Cited

U.S. PATENT DOCUMENTS

| | | |
|---|---|---|
| 5,051,745 A | 9/1991 | Katz |
| 5,197,128 A | 3/1993 | Campbell et al. |
| 5,580,177 A | 12/1996 | Gase et al. |
| 5,768,583 A | 6/1998 | Orzol et al. |
| 6,104,716 A | 8/2000 | Crichton et al. |
| 6,151,624 A | 11/2000 | Teare et al. |
| 6,233,688 B1 | 5/2001 | Montenegro |
| 6,301,012 B1 | 10/2001 | White et al. |
| 6,424,424 B1 | 7/2002 | Lomas et al. |
| 6,510,464 B1 | 1/2003 | Grantges, Jr. et al. |
| 6,662,228 B1 | 12/2003 | Limsico |
| 6,754,831 B2 | 6/2004 | Brownell |
| 6,975,419 B2 | 12/2005 | Staas et al. |
| 6,990,527 B2 | 1/2006 | Spicer |
| 7,007,093 B2 | 2/2006 | Spicer |
| 7,016,062 B2 | 3/2006 | Ishizuka |

(Continued)

FOREIGN PATENT DOCUMENTS

| | | |
|---|---|---|
| CA | 02234192 | 4/1998 |
| EP | 0924597 | 6/1999 |

OTHER PUBLICATIONS

Website: "ComputerWorld/S/Article/9175895/HP Unveils Remote Printing Service for BlackBerry Devices". (http://www.computerworld.com/s/article/9175895/HP_unveils_remote_printing_service_for_BlackBerry_devices). Apr. 21, 2010. 4 pp.

(Continued)

*Primary Examiner* — Ming Hon
(74) *Attorney, Agent, or Firm* — Fincham Downs, LLC; Carson C. K. Fincham

(57) ABSTRACT

In some embodiments, an interface is provided that allows a user to view, identify, select, and/or contact one or more remote printing locations (e.g., in proximity to the user). In some embodiments, documents queued for remote and/or mobile printing may be released and/or printed based on proximity of a user to the printing device, or based on a release command provided by the user via the Internet and/or SMS, and/or based on other print-release triggers and/or rules.

16 Claims, 9 Drawing Sheets

(56) References Cited

U.S. PATENT DOCUMENTS

| | | | |
|---|---|---|---|
| 7,190,471 B2 | 3/2007 | Sandfort et al. | |
| 7,249,188 B2 | 7/2007 | Spicer | |
| 7,827,293 B2 | 11/2010 | Spicer | |
| 7,903,292 B2 | 3/2011 | Mickeleit | |
| 7,904,594 B2 | 3/2011 | Spicer | |
| 2002/0013869 A1* | 1/2002 | Taniguchi et al. | 710/33 |
| 2002/0066026 A1 | 5/2002 | Yau et al. | |
| 2002/0112183 A1 | 8/2002 | Baird, III et al. | |
| 2002/0144016 A1 | 10/2002 | Spicer | |
| 2002/0155843 A1 | 10/2002 | Bahl et al. | |
| 2002/0191210 A1* | 12/2002 | Staas et al. | 358/1.15 |
| 2003/0018815 A1 | 1/2003 | Spicer | |
| 2003/0053122 A1* | 3/2003 | Kinoshita | 358/1.15 |
| 2003/0137688 A1 | 7/2003 | Lawrence et al. | |
| 2004/0024649 A1* | 2/2004 | Howard | 705/26 |
| 2004/0139229 A1 | 7/2004 | Mickeleit | |
| 2004/0190049 A1 | 9/2004 | Itoh | |
| 2005/0063005 A1* | 3/2005 | Phillips et al. | 358/1.15 |
| 2005/0084113 A1* | 4/2005 | Simpson et al. | 380/270 |
| 2005/0085241 A1 | 4/2005 | Bahl et al. | |
| 2005/0094184 A1* | 5/2005 | Suyehira | 358/1.14 |
| 2005/0128501 A1* | 6/2005 | Choi et al. | 358/1.13 |
| 2005/0174609 A1* | 8/2005 | Thurlow | 358/425 |
| 2006/0044598 A1 | 3/2006 | Etelapera | |
| 2006/0136726 A1* | 6/2006 | Ragnet et al. | 713/171 |
| 2006/0268315 A1* | 11/2006 | Randt | 358/1.15 |
| 2008/0117451 A1* | 5/2008 | Wang | 358/1.15 |
| 2008/0193182 A1 | 8/2008 | Sasama | |
| 2011/0138076 A1 | 6/2011 | Spicer | |
| 2011/0208864 A1 | 8/2011 | St. Laurent | |
| 2011/0209211 A1 | 8/2011 | Kuindersma | |
| 2012/0011581 A1 | 1/2012 | Spicer | |
| 2012/0011582 A1 | 1/2012 | Spicer | |
| 2012/0011583 A1 | 1/2012 | Spicer | |
| 2012/0023569 A1 | 1/2012 | Spicer | |
| 2012/0069385 A1 | 3/2012 | Van Hatten | |
| 2012/0069386 A1* | 3/2012 | St. Laurent et al. | 358/1.15 |
| 2012/0072595 A1 | 3/2012 | St. Laurent | |
| 2012/0300251 A1 | 11/2012 | St. Laurent | |
| 2013/0107312 A1* | 5/2013 | Venkatesh | 358/1.15 |

OTHER PUBLICATIONS

Website: "PCWorld/BusinessCenter/Article1205871/Xerox Enables Remote Printing From Smartphones Tablets". (http://www.pcworld.com/businesscenter/article/205871/xerox_enables_remote_printing_from_smartphones_tablets.html). Sep. 21, 2010. 3 pp.
Website: "Msnbc.msn.com/ID/40334628/ EFI Makes iPad, iPhone and iPod touch Printing Easy with PrintMe Connect for AirPrint". (http://www.msnbc.msn.com/id/40334628). Nov. 23, 2010. 4 pp.
Website: "Live/LewisPR.com/QuickofficeSD/2011/03/18/Quickoffice Brings New Social Publishing Capabilities Printing and PDF Support to its Mobile Office Productivity iPad App". (http://live.lewispr.com/quickofficesd/2011/03/18/quickoffice-brings-new-social-publishing-capabilities-printing-and-pdf-support-to-its-mobile-office-productivity-ipad-app-27208). Mar. 18, 2011. 3 pp.
Website: "Chocolate Chunk Apps/Blackberry Applications/Remote Print". (http://www.chocolatechunkapps.com/applications/remoteprint/). download date: Aug. 22, 2011, 9 pp.
Website: "ActivePrint". (http://www.activeprint.net/). download date: Aug. 22, 2011, 2 pp.
Website: "My Office Portal/HP CloudPrint: Streamlining Your Mobile Office". (http://www.myofficeportal.org/hp-cloudprint-streamlining-your-mobile-office.htm). download date: Aug. 22, 2011. 3 pp.
Website: "Tazzle IT". (http://www.tazzleit.com/). download date Aug. 22, 2011. 1 pp.
Website: "Google Cloud Print Reveals the Futures of Printing" (http://mashable.com/2010/04/16/google-cloud-print/) download date: Mar. 13, 2013.
Website: "An update on Google Cloud Print" (http://blog.chromium.org/2010/06/update-on-google-cloud-print.html), download date: Jun. 7, 2010.
Website: "How does cloud printing work?" http://www.cloud-printing-alliance.com/en/menu/AboutCloudPrinting/Howdoescloudprintingwork.aspx; downloaded Feb. 4, 2013.
"Internet Printing Protocol IPP/1.0" BOF on Internet Printing, Dec. 12, 1996; 27 pps.
"Novell Proposes Internet Printing Standard with Support from Print Industry Leaders" Novell, press release Oct. 21, 1996; 3 pps.
"Internet Printing Protocol IPP/1.0" BOF on Internet Printing, Dec. 12, 1996; 24 pps.
Herriot et al. "Internet Printing Protocol/1.0: Encoding and Transport" Network Working Group, Apr. 1999; 37 pps.
deBry et al. "Internet Printing Protocol/1.0: Model and Semantics" Network Working Group, Apr. 1999; 173 pps.
Herriot et al. "Internet Printing Protocol/1.0: Encoding and Transport" Network Working Group, Sep. 2000; 46 pps.
Hastings et al. "Internet Printing Protocol/1.0: Model and Semantics" Network Working Group, Sep. 2000; 224 pps.
"Information Technology—Text and Office Systems—Document Printing Application" International Standard, Sep. 1, 1996; 508 pps.
"Information Technology—Text and Office Systems—Document Printing Application" International Standard ISO/IEC 10175-1:1196, Jul. 1, 1998; 5 pps.
"Information Technology—Text and Office Systems—Document Printing Application" International Standard ISO/IEC 10175-1:1996, Nov. 15, 1998; 7 pps.
"Information Technology—Text and Office Systems—Document Printing Application" International Standard ISO/IEC 10175-1:1996, Technical Corrigendum 3, Dec. 1, 1998; 10 pps.
"Information Technology—Text and Office Systems—Document Printing Application" International Standard ISO/IEC 10175-1:1996, Technical Corrigendum 4, Dec. 1, 1998; 6 pps.
Isaacson et al., "LDPA—Lightweight Document Printing Application" Proposed Internet-Draft, Version 0.8, Oct. 31, 1996; 64 pps.
Isaacson, S., "An LDPA URL Format" Novell, Inc., Nov. 1996; 5 pps.
Isaacson, et al., "LDPA Data Types Using XDR" Version 0.8, Oct. 31, 1996; 46 pps.
"LDPA Ideas" Nov. 6, 1996; 20 pps.
Landau et al., "Design of the DECprint Common Printer Supervisor for VMS Systems" Digital Technical Journal vol. 3 No. 4; Fall 1991; 28 pps.
Hobbs, Marvin "Multifunction Peripherals for PCs" Newnes, 2000, 229 pps.
Barnes et al., "The Official Red Hat Linux Users Guide" Red Hat Linux; Revision 4.0, Aug. 1996; 383 pps.
"Transmission of Non-Telephone Signals", Video Coding for Low Bit Rate Communication; International Telecommunication Union; Mar. 1996; 52 pps.
"The Next Generation in Compression Software", Shareware Manual; 1989-1992 PKWARE Inc.; 99 pps.
P. Deutsch, "DEFLATE Compressed Data Format Specification version 1.3", Network Working Group; Aladdin Enterprises, May 1996; 15 pps.
Lindner, Paul "Registration of a new MIME Content—Type/Subtype", Jul. 20, 1993.
Carstensen et al. "Implementing Linux in Your Network Using Samba" International Technical Support Organization (http://www.redbooks.ibm.com) Nov. 1999; 104 pps.
Eckstein et al. "Using Samba" O'Reilly Onine Catalog; 1st Edition, Nov. 1999; 465 pps.
"Windows MCI VTR Driver" Legacy MCI VTR Control (http://www.drastic.tv) 2014; 3 pps.
Redmond, "Bolster Your Exchange Server's Resilience" Exchange 5.5/E and Microsoft Cluster Server; Jan. 31, 1998; 7 pps.
"POP3 Scan Mailbox" User Guide; Version 1.0; Jul. 1998; 56 pps.
Rose, M. "Post Office Protocol—Version 3" Network Working Group; Nov. 1988; 32 pps.
Myers, J. "POP3 Authentication Command" Nework Working Group; Dec. 1994; 5 pps.
Myers et al., "Post Office Protocol—Version 3" Network Working Group; May 1996; 23 pps.
Gellens et al., "POP3 Extension Mechanism" Network Working Group; Nov. 1998; 19 pps.

(56) References Cited

OTHER PUBLICATIONS

Linn, J., "Privacy Enhancement for Internet Electronic Mail" Network Working Group; Feb. 1993; 42 pps.
Kaliski, B., "RSA Encryption" Network Working Group; Mar. 1998; 19 pps.
"Don's review of the Newton Message Pad 2000" Small Dog Electronics; Jul. 1, 1997; 3 pps.
Ringel, E."Newton? Get Serious!" MacTech; vol. 13, Issue 4; 1997; 6 pps.
"Simon Says 'Here's How!'" Simon Mobile Communications Made Simple, Users Manual; 41 pps.
Srinivasa et al., "Fast and Scalable Layer Four Switching" ACM SIGCOMM Computer Communication Review, ACM Digital Library; vol. 28 Issue 4; pp. 191-202, Oct. 1998; 2 pps.
Lakshman et al., "High-Speed Policy-based Packet Forwarding Using Efficient Multi-dimensional Range Matching" ACM SIGCOMM Computer Communication Review, ACM Digital Library; vol. 28 Issue 4; pp. 203-214, Oct. 1998; 2 pps.
Cheswick et al., "Firewalls and Internet Security" Addison-Wesley Professional Computing Series; 1994; 299 pps.
Packet Filters Using Cisco Access Lists; Cisco ACL Presentation, Jun. 19, 1997; 22 pps.
Clark, Tim; "Windows NT Firewalls Unveiled" CNET News; Oct. 13, 1998; 2 pps.
Rideau, Francois-Rene, Firewall Piercing mini-HowTo: Nov. 27, 1998; 7 pps.
Rideau, Francois-Rene, Firewall Piercing mini-HowTo text: v0.3b; Nov. 27, 1998; 1 pp.
Ingham et al., "A History and Survey of Network Firewalls" The University of New Mexico Computer Science Department Technical Report 2002-37; 42 pps.
Kessler, Gary "Firewall Routers and Packet Filtering" Network VAR, Feb. 1995; 6 pps.
Lakshman et al. "High-Speed Policy-Based Packet Forwarding Using Efficient Multi-Dimensional Range Matching" Bell Laboratories; 12 pps.
Lodin et al. "Firewalls Fend Off Invasions From the Net" IEEE Spectrum, Feb. 1998; 9 pps.
Majewski et al. "Protect and Survive Using IBM Firewall 3.1 for AIX" International Technical Support Organization; Feb. 1998; 326 pps.
Freed, N., "Behavior of and Requirements for Internet Firewalls" Network Working Group; Oct. 2000; 7 pps.
Rideau, Francois-Rene, Firewall Piercing mini-HowTo: v0.3b; Nov. 27, 1998; 12 pps.
"Using RTSP with Firwalls, Proxies, and Other Intermediary Network Devices" RealNetworks, Inc., 1998, Version 2.0/Rev.2; 16 pps.
Sheldon, Tom "General Firewall White Paper" WindowsNT-Security Handbook, Nov. 1996; 9 pps.
Srinivasa et al., "Fast and Scalable Layer Four Switching" ACM SIGCOMM Computer Communication Review, ACM Digital Library; 12 pps.
Toombs, Douglas "Poor Man's Firewall" Networking Content from Windows IT Pro; Nov. 30, 1998; 7 pps.
Wasti, Shubhash "Harware Assisted Packet Filtering Firewall" University of Sasketchewan—Department of Computer Science; 10 pps.
Zwicky et al. "Building Internet Firewalls" Internet and Web Security, Second Edition, Jun. 2000; 896 pps.
Avolio et al. "Application Gateways and Stateful Inspection: A Brief Note Comparing and Contrasting" Trusted Information System, Inc.; Jan. 22, 1998; 7 pps.
Avolio, Frederick "Firewalls and Internet Security, the Second Hundred (internet) Years" IPJ, vol. 2, No. 2, Jun. 1999; 7 pps.
Clark, Tim "Proxy Server 2.0 Crowds Firewalls" CNET News, Jun. 30, 1997; 3 pps.
Cooper, S.P. "Firewall Products Today" Lawrence Livermore National Laboratory, Feb. 1995; 18 pps.
"Firewalls" Network Systems, May 1, 1997; 15 pps.
FWTK Documentation (www.Fwtk.Org) 10 pps.
Raithel, John "Gauntlet for IRIX—Administrator's Guide" Document No. 007-2826-007, Version 4.1; 430 pps.
"Gauntet Internet Firewall FAQ" (http://www.tis.com/docs/products/gauntet/gautletfaq.html) 25 pps.
"Network Associates Gauntlet Firewall Wins 'Best of Show' Honors at Networld+Interop for 'Adaptive' Breakthrough" PRNewswire; Oct. 28; 2 pps.
Kelly et al. "Firewalls: Securing NT Networks from Internet Intruders" Windows IT Pro, Oct. 31, 1996; 8 pps.
"Gauntlet for IRIX Administrator's Guide" SGI; Jul. 22, 1999; 10 pps.
Snyder, Joel "Asbestos for the Network" Network World, Febuary 3, 1997; 8 pps.
"Build a Firewall Behind Your Firewall" CNET News, Mar. 20, 1996, 2 pps.
Cerf et al. "Specification of Internet Transmission Control Program" Network Working Group, Dec. 1974; 70 pps.
"Transmission Control Protocol" Darpa Internet Program, Sep. 1981; 89 pps.
Braden, R., "Requirements for Internet Hosts—Communication Layers" Network Working Group, Oct. 1989; 116 pps.
Socolofsky et al. "A TC/IP Tutorial" Network Working Group, Jan. 1991; 28 pps.
Fielding et al. "Hypertext Transfer Protocol—HTTP/1/1" Network Working Group, Jan. 1997; 162 pps.
Allman et al. "TCP Congestion Control" Network Working Group, Apr. 1999; 14 pps.
Shapiro, Marc "Structure and Encapsulation in Distributed Systems: the Proxy Principle" Proc. 6th Int. Conf. on Distributed Computing Systems, May 1986, pp. 198-204; 13 pps.
Gianone et al., "VAX/VMS Kermit-32 User Guide" Columbia University, Version 3.3.126, Jul. 1990; 26 pps.
"VAX Rdb/VMS—Guide to Using RDO, RDBPRE, and RDML" Digital Equipment Corporation, Dec. 1990; 642 pps.
"VAXC/VMS Primer" Digital Equipment Corporation, May 1982; 92 pps.
Helmig, Johannes "Network Printing" WindowsNetworking.com, Feb. 7, 1998; 5 pps.
Collins et al. "Windows 2000 Configuration Wizards" Syngress Media, Inc., 2000, 465 pps.
Craft et al. "Building a CISCO Network for Windows 2000" Syngress Media, Inc., 2000, 600 pps.
Crawford, Sharon "Windowns 2000 Pro" Pogue Press, 2000; 458 pps.
"Microsoft Releases Windows 2000 to Manufacturing" Microsoft, Dec. 15, 1999; 5 pps.
Shields et al. "Windows 2000 Server System Administration Handbook" Sygress Media, Inc., 2000; 833 pps.
Shinder et al. "Troubleshooting Windows 2000 TCP/IP" Sygress Media, Inc., 2000; 738 pps.
Shinder et al. "Managing Windows 2000 Network Services" Sygress Media, Inc., 2000; 705 pps.
Stansel et al. "Configuring Citrix Metaframe for Windows 2000" Sygress Media, Inc.; 578 pps.
Walshaw, Robin "Mission Critical Windows 2000 Server Administration" Sygress Media, Inc.; 753 pps.
"Windows NT Server 4.0 Product Documentation" Microsoft TechNet; download date: May 25, 2014; 1 pp.
"Networking Supplement—MS Windows NT Server 4.0" Microsoft Windowns NT Server 4.0; download date May 25, 2014; 1 pp.
Helmig, Johannes "NT4 User Permissions" WindowsNetworking.com; Nov. 1, 1997; 3 pps.
"Chapter 1—Introduction to Windows NT Routing with Routing and Remote Access Service" Windows NT Server Product Documentation; download date May 25, 2014; 11 pps.
"Appendix A—Windows NT Registry" Windows NT Registry; download date May 25, 2014; 13 pps.
"Chapter 7—Printing" Windows NT Workstation Resource Kit; download date May 25, 2014; 32 pps.
"Administration Guide—Connection Point Services" Windows NT; download date May 25, 2014; 26 pps.
"Chapter 6—Backing Up and Restoring Network Files" Windows NT; download date May 25, 2014; 10 pps.

(56) References Cited

OTHER PUBLICATIONS

"Concepts and Planning—MS Windows NT Server 4.0" Windows NT; download date May 25, 2014; 1 pp.
"Chapter 12—Licensing and License Manager" Windows NT; download date May 25, 2014; 12 pps.
"Chapter 11—Managing Client Administration" Windows NT; download date May 25, 2014; 5 pps.
"Chapter 4—Managing Shared Resources and Resource Security" Windows NT; download date May 25, 2014; 32 pps.
"Chapter 3—Managing User Work Environments" Windows NT; download date May 25, 2014; 20 pps.
"Managing Windows NT Server Domains" Windows NT; download date May 25, 2014; 27 pps.
"MS Cluster Server Administrator's Guide" Windows NT; download date May 25, 2014; 1 pp.
"MS Message Queue Server 1.0 Release Notes" Windows NT; download date May 25, 2014; 12 pps.
"Chapter 9—Monitoring Events" Windows NT; download date May 25, 2014; 11 pps.
"Chapter 8—Monitoring Performance" Windows NT; download date May 25, 2014; 18 pps.
"Chapter 10—Monitoring Your Network" Windows NT; download date May 25, 2014; 11 pps.
"Appendix B—Other Application Environments" Windows NT; download date May 25, 2014; 9 pps.
"Chapter 7—Protecting Data" Windows NT; download date May 25, 2014; 25 pps.
"Chapter 5—Setting Up Print Servers" Windows NT; download date May 25, 2014; 22 pps.
"Chapter 2—Working with User and Group Accounts" Windows NT; download date May 25, 2014; 26 pps.
Hunt et al. "TCP/IP Network Administration" O'Reilly, Oct. 1998; 519 pps.
Thomas et al. "Building your Intranet with Windows NT 4.0" Wiley Computer Publishing, 1997; 483 pps.
Curtin, Matt "Introduction to Network Security" Kent Information Services, Inc.; Mar. 1997; 16 pps.
Hall, Eric A. "Internet Core Protocols" O'Reilly; Feb. 2000; 474 pps.
Walrand et al. "High-Performance Communication Networks" The Morgan Kaufmann Series in Networking, Second Edition, 2000; 716 pps.
"Computer Dictionary" Microsoft Press, Second Edition 1994; 12 pps.

\* cited by examiner

400

| PRINTER DEVICE ID 405 | DOC ID 410 | PRINT INSTRUCTIONS 415 | PRINT/RELEASE TRIGGER 417 | PRINT/RELEASE STATUS 420 |
|---|---|---|---|---|
| HP Laser 00073-99-af1077355901132 | e67c391c93e0149216 | color; duplexing | user proximity < 5 minutes | print successful / user < 5 minutes |
| Brother MFC-9840CDW-db97664100caca912 | 7da81939333fa9a875 | black & white; rotate orientation | user device detected | print successful / MAC_ID = 3dhf7s |
| Brother MFC-97907AX-7ef0rf5538772 | 8873151f566d09689 | black & white; print comments | user proximity < 100 yds | pending / user > 1 mile away |
| Xerox Phaser 3124-9733-rfs005211734099xb33 | 8873151f566d09689 | color | user device in wi-fi range | pending / not detected in network |
| Xerox Phaser 3124-9733-rfs005211734099xb33 | 8873151f566d09689 | color | user-initiated release | pending / no release instruction |

SECURE MOBILE PRINTING FROM A THIRD-PARTY DEVICE

CROSS-REFERENCE TO RELATED APPLICATIONS

This application claims benefit and priority (i) under 35 U.S.C. §120 to, and is a Continuation-In-Part (CIP) of, U.S. patent application Ser. No. 12/764,287 filed on Apr. 21, 2010 in the name of Hansen and titled "SYSTEMS, METHODS AND DEVICES FOR PRINTING FROM A MOBILE DEVICE", which itself claims benefit and priority under 35 U.S.C. §119(e) to U.S. Provisional Application No. 61/185,541, filed Jun. 9, 2009 in the name of Hansen and titled "SYSTEMS, METHODS, AND DEVICES FOR PRINTING FROM A PORTABLE COMPUTING DEVICE," and (ii) under 35 U.S.C. §119(e) to U.S. Provisional Application No. 61/567,191, filed on Dec. 6, 2011 in the name of Hansen and titled "PRINTING FROM A MOBILE DEVICE", each of the above-referenced applications of which is incorporated by reference herein in its entirety.

BACKGROUND

The capability of remote and/or mobile printing of documents presents many difficulties of implementation. These difficulties are particularly relevant in the case that public and/or third-party printing devices are utilized to effectuate such remote and/or mobile printing.

BRIEF DESCRIPTION OF THE DRAWINGS

The foregoing and other features, aspects and advantages of the invention are described in detail below with reference to the drawings of various embodiments, which are intended to illustrate and not to limit the invention. The drawings comprise the following figures in which:

FIG. 4 is an example table of one embodiment of a printing queue database;

DETAILED DESCRIPTION OF THE EMBODIMENTS

Figure 1A:
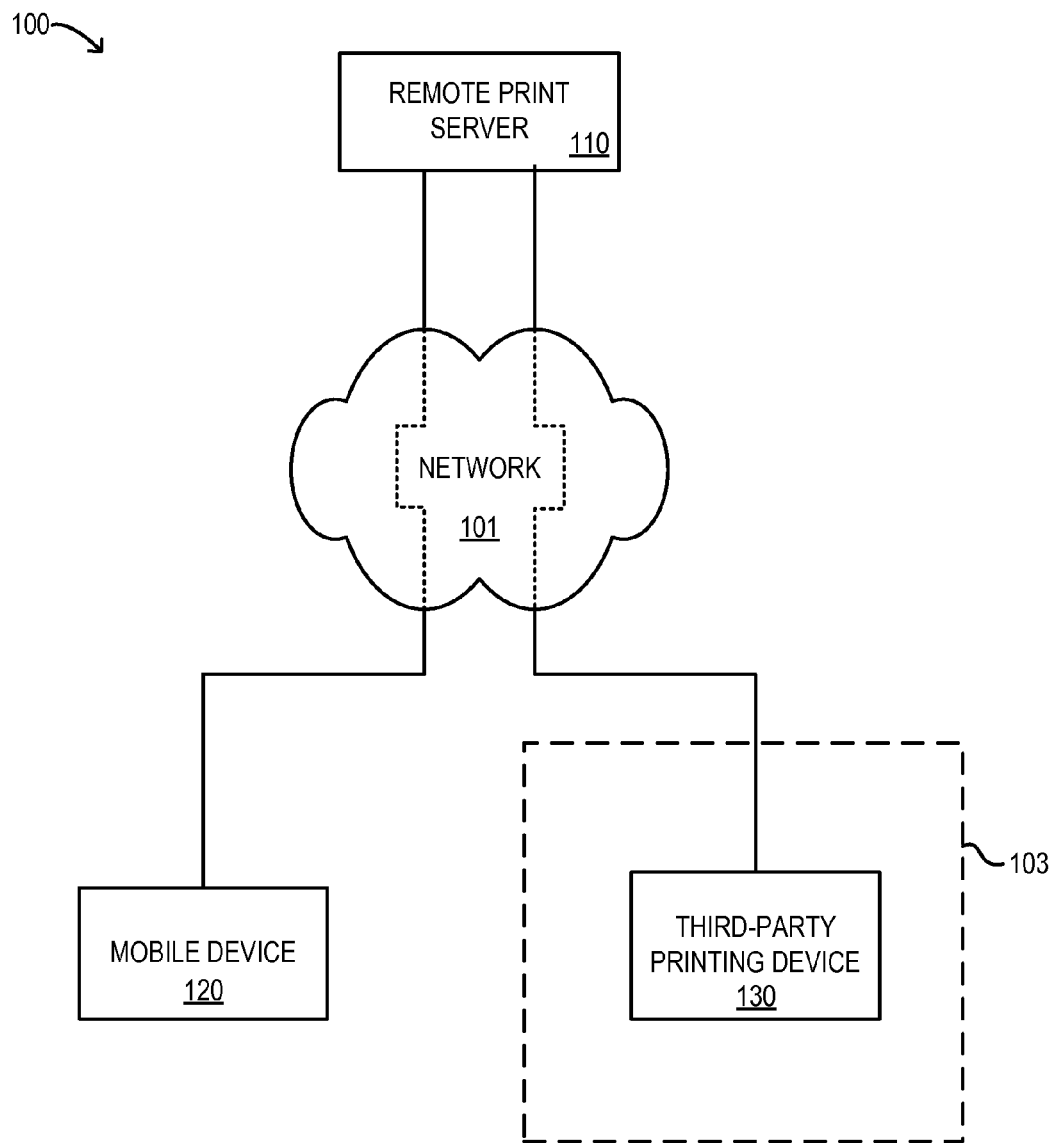
FIG. 1A is a schematic diagram of an embodiment of a remote printing system.

Certain aspects, advantages, and novel features of various embodiments are described herein. It is to be understood that not necessarily all such advantages may be achieved in accordance with any particular embodiment. Thus, for example, those skilled in the art will recognize that embodiments may be effectuated and/or carried out in a manner that achieves one advantage or group of advantages as taught herein without necessarily achieving other advantages as may be taught or suggested herein.

Although several embodiments, examples and illustrations are disclosed herein, it will be understood by those of ordinary skill in the art that the embodiments described herein extend beyond the specifically disclosed embodiments, examples and illustrations and include other uses and obvious modifications and equivalents thereof. Embodiments are described herein with reference to the accompanying figures, wherein like numerals refer to like elements throughout. The terminology used in the description presented herein is not intended to be interpreted in any limited or restrictive manner simply because it is being used in conjunction with a detailed description of certain specific embodiments. In addition, embodiments may comprise several novel features and it is possible that no single feature is solely responsible for its desirable attributes or is essential to practicing the embodiments described herein.

Applicant has recognized that users of computing devices often receive or create documents and/or other files via a mobile device (for example but not limited to a handheld smart phone such as a BLACKBERRY, IPHONE, or another portable computing device operable to receive and/or create documents). Applicant has further recognized that users of such mobile devices may desire to print documents received or created via such mobile devices. For example, such mobile devices may have a screen/display that is small or does not permit easy reading and/or reviewing of such documents or easy review of such documents by multiple users.

It should be understood that the embodiments described herein are not limited to use with mobile devices (although the embodiments are described mainly with reference to such devices, for ease of understanding), but are equally applicable to any computing device that does not have direct access to a printing device on which a user desires to print a document and any reference to a "mobile device" herein should generally be understood to equally refer to any such computing device, as appropriate, unless otherwise specifically limited (e.g., in a claim) to a particular species of mobile device such as, but not limited to, a smart phone, a wireless telephone, a tablet device, and/or a "smart" watch. A "document" as the term is utilized herein, generally refers to any collection of data capable of being rendered on a tangible medium (e.g., paper), such as a WORD, EXCEL or PDF file, or an image file.

Applicant has still further recognized that although various solutions for printing documents from mobile devices are available, these solutions do not allow a user to print a document from a mobile device in certain circumstances, thus leaving a need for a solution that expands the situations in which a user may easily print a document from, e.g., a mobile device.

For example, a user might be on her morning commute to her company office, and receive via her mobile device an email containing a document attachment that she would like to review as soon as she reaches the office, but which will take significant time to print. Accordingly, she may desire to have her office printer print the document so that the printed document will be waiting for her by the time she arrives. However, if the company at which the user works has not retained an Information Technology (IT) professional to install enterprise printing capabilities that would allow the user to print from her mobile device to a company printer (an expensive proposition that many companies do not have the resources to provide), the user is unable to do so. Further, even if the user's company has provided such enterprise-level printing capability, the user would be restricted to printing the document to whichever enterprise printer was previously selected by the IT professional for such a purpose. The systems, methods, and devices disclosed herein allow the user to use her mobile device to print the document attachment via her office printer, irrespective of whether the company IT professional has provided any enterprise-level printing capabilities and irrespective of which enterprise printer the IT professional has selected for such printing. Further, in accordance with embodiments described herein, the user could alternately or additionally print the document to another printer (e.g., her home printer and/or one or more designated public and/or third-party printers) as well, such that the document will be waiting for her when she returns home (or arrives at the public/third-party printer location, as the case may be) and/or could be queued for printing by such home-based, third-party, and/or public printer location upon a receipt, transmittal, and/or occurrence of a printing and/or release trigger as described herein.

In another example, a user might be at home when he receives, via a mobile device, an email containing an attachment he needs to review promptly. Though he may be in his home and near his home office, with a computer and a printer just inches away, he cannot print the document without first either logging in to his employer's virtual private network and going through a series of other complicated procedures (if, indeed, he is able to print the document at all) or logging into his computer and accessing a remote email system to retrieve the email and attachment for printing on his home computer (and even then is only able to print the document if he has the appropriate program installed locally on his computer for viewing files in the format in which the document is saved such as PDF or DOCX). The systems, methods, and devices disclosed herein allow a user in such a situation to use his mobile device to print the document attachment via his home office printer without having to log in to the employer's email system or engaging in other complicated steps or procedures, without his mobile device requiring BLUETOOTH or other specialized capabilities for communicating directly with a printer and/or without first having to determine a network address or other identifier of his home office printer.

Disclosed herein are systems, methods, and devices for transmitting and/or printing from a mobile device (and/or other computing device not directly connected to or in communication with a printer) to a printer connected to a network and/or connected to another computer. The embodiments disclosed herein may comprise at least three computers: (i) a mobile device; (ii) an intermediary server, for example, a server operable to communicate over the Internet or other network (referred to as a "remote print server" herein); and (iii) a networked/Internet connected printer with a built-in spooling system and/or a networked/Internet connected computer connected (via a network or otherwise) to a printer (referred to as a "printing device", or more specifically, a "public" or "third-party" printing device, herein, as the case may be). In accordance with some embodiments, while the mobile device and the printing device may be under the control or operation of the user, the remote print server is under the control or operation of a commercial entity providing a service that allows the user to print a document from his mobile device to a printing device to which the mobile device does not otherwise have access. In an embodiment, each of the foregoing devices can operate/run respective software configured to enable remote printing from a mobile device or other computing device not having direct access to the printing device. The software can be easy to use, platform-independent, printer-independent, and/or free of any enterprise-level installation requirements for business users.

In accordance with one embodiment, a remote print server is operable to receive, in association with a user identifier uniquely identifying a user, an indication of at least one computing device operable to print a document, thereby receiving an indication of at least one printing device; store the indication of the at least one printing device in association with the user identifier prior to receiving any requests to print documents in association with the user identifier; receive from a mobile device a request to print a document, the request including the user identifier; receive from the mobile device a selection of the at least one printing device associated with the user identifier, thereby determining a selected printing device; receive from the mobile device data comprising the document; place the document in a print queue for the selected printing device; and transmit the document to the selected printing device for printing. In some embodiments, information defining and/or identifying one or more print-timing rules such as print release triggers may be transmitted and/or otherwise provided to the printer (e.g., particularly in the case that the printer comprises a public and/or third-party printer).

In accordance with one embodiment, a non-transitive memory storage medium stores (i) a database storing an indication of a plurality of registered users, each registered user being associated with at least one mobile device and at least one printing device; (ii) an application for receiving documents from mobile devices to be printed on printing devices specified by a registered user, the application operable to listen for any requests from mobile devices for the printing of documents, receive from the mobile devices documents to be printed, and store the documents to be printed in an appropriate print queue associated with a printing device indicated by a communication from the mobile device from which a request to print a document was received; and (iii) an application for orchestrating the printing of a document on a printing device, the application operable to listen for any print queue queries from printing devices, retrieve any print jobs pending in a print queue corresponding to such a querying printing device and, in response to such a query, transmit the document to be printed and/or print release trigger rules to the querying printing device. In some embodiments, the printing device may comprise a printing device to which the mobile device does not otherwise have access.

In one or more embodiments, the systems, methods, and devices do not require the mobile device to download or store any printer drivers. In one or more embodiments, the systems, methods, and devices may not require installation at an enterprise or corporate level and/or the user may install all the required software without assistance from IT personnel. In one or more embodiments, the remote printing systems, methods, and devices do not require a printer with any special capabilities such as infrared, BLUETOOTH or other wireless protocols. In one or more embodiments, the remote printing systems, methods, and devices do not require the user to know the network address of any printer or of any computer connected to any printer. The remote printing systems, methods, and devices may be used with any number of different operating systems. The remote printing systems, methods, and devices may work with firewalls or other network protection software (for example, by operating through an accessible port, for example, port eighty (80) for hypertext transfer protocol or HTTP).

Referring now to FIG. 1A, illustrated therein is an example system 100 consistent with one or more embodiments. The system 100 comprises a remote print server 110, a mobile device 120 and a third-party printing device 130, which in some embodiments may each be operable to communicate with at least one other device of system 100 via a network 101. The network 101 may comprise, for example, the Internet, a Wide-Area Network (WAN), another network or a combination of such networks. Additionally, in some embodiments the third-party printing device 130 may be located behind a firewall 103. In some embodiments, system 100 may be configured such that remote print server 110 may communicate with the third-party printing device 130 in such a way as to be uninhibited by the existence of any firewall 103 (illustrated with a dotted line to represent that some third-party printing devices 130 will be protected by firewalls and others may not). It should be understood that although not shown in FIG. 1A, other networks and devices may be in communication with any of the devices of system 100. For example, the mobile device 120 may be in communication with a mobile network (not explicitly shown) such as a pager or cellular telephone network that accommodates wireless communication with mobile devices as is generally known to those skilled in the art.

The remote print server 110 may comprise one or more computing devices, working in parallel or series if more than one, operable to facilitate the remote printing functions described herein. A more detailed description of an example remote print server is provided herein with reference to FIG. 2.

The mobile device 120 may comprise, for example, a computing device operable to receive documents (e.g., via email as attachments). In some embodiments the mobile device 120 may comprise a mobile or portable computing device such as a smartphone (e.g., the IPHONE manufactured by APPLE, the BLACKBERRY manufactured by RESEARCH IN MOTION, the PRE manufactured by PALM or the DROID manufactured by MOTOROLA), a Personal Digital Assistant (PDA), cellular telephone, tablet (such as the IPAD manufactured by APPLE), laptop or other portable computing device.

The third-party printing device 130 may comprise a printer or a computing device (e.g., a desktop computer) that is operable to cause a printer it is in communication with to print a document, in either case operable to communicate via network 101 (e.g., through firewall 103). In some embodiments, the third-party printing device 130 may not comprise a "third-party" device and may instead be owned and/or operated by a user or customer (not shown in FIG. 1A) of the mobile device 120, in which case it may instead be generally referred to as a "printing device" and/or specifically referred to as a "customer printing device". In some embodiments the third-party printing device 130 may indeed comprise a "third-party" device and may be owned and/or operated, for example, by an entity (also not shown in FIG. 1A) that owns and/or operates the remote print server 110, and/or a third-party (such as an owner and/or operator of a public and/or quasi-public (e.g., available upon payment and/or commitment to pay a fee) printer, also not shown in FIG. 1A). According to some embodiments, the third-party may comprise, but is not limited to, a retail printing and/or document services establishment (such as a KINKOS or UPS STORE) and/or another public and/or quasi-public print service provider (e.g., a library, a hotel business center, and/or a post office).

It should be understood that each of the devices 110, 120 and 130 may communicate directly or indirectly, via a wired or wireless medium such as the Internet, a Local Area Network (LAN), a WAN or Ethernet, Token Ring, or via any appropriate communications means or combination of communications means. For example, in one embodiment communication among any and all of the devices of system 100 may occur over the Internet through a Web site maintained by a computer on a remote server or over an on-line data network including commercial on-line service providers, bulletin board systems and the like. In yet other embodiments, communication among any of the devices of system 100 may occur over RF, cable TV, satellite links and the like.

The system 100 may be operable to facilitate communication among the devices 110, 120 and 130 using known communication protocols. Possible communication protocols that may be part of the system 100 include, but are not limited to: Ethernet (or IEEE 802.3), ATP, BLUETOOTH, HTTP, HTTPS and Transmission Control Protocol/Internet Protocol (TCP/IP). Communication may be encrypted to ensure privacy and prevent fraud in any of a variety of ways well known in the art, some of which are described herein.

It should be understood that although only one mobile device 120 and one third-party printing device 130 is illustrated, any number of mobile devices 120 and third-party printing devices 130 may be used and, in many embodiments, a large number of each such device would be part of system 100, the number changing as users are added/registered with the system 100 and/or discontinue using the system 100 or update the mobile devices 120 and/or third-party printing devices 130 associated with them.

Figure 1B:
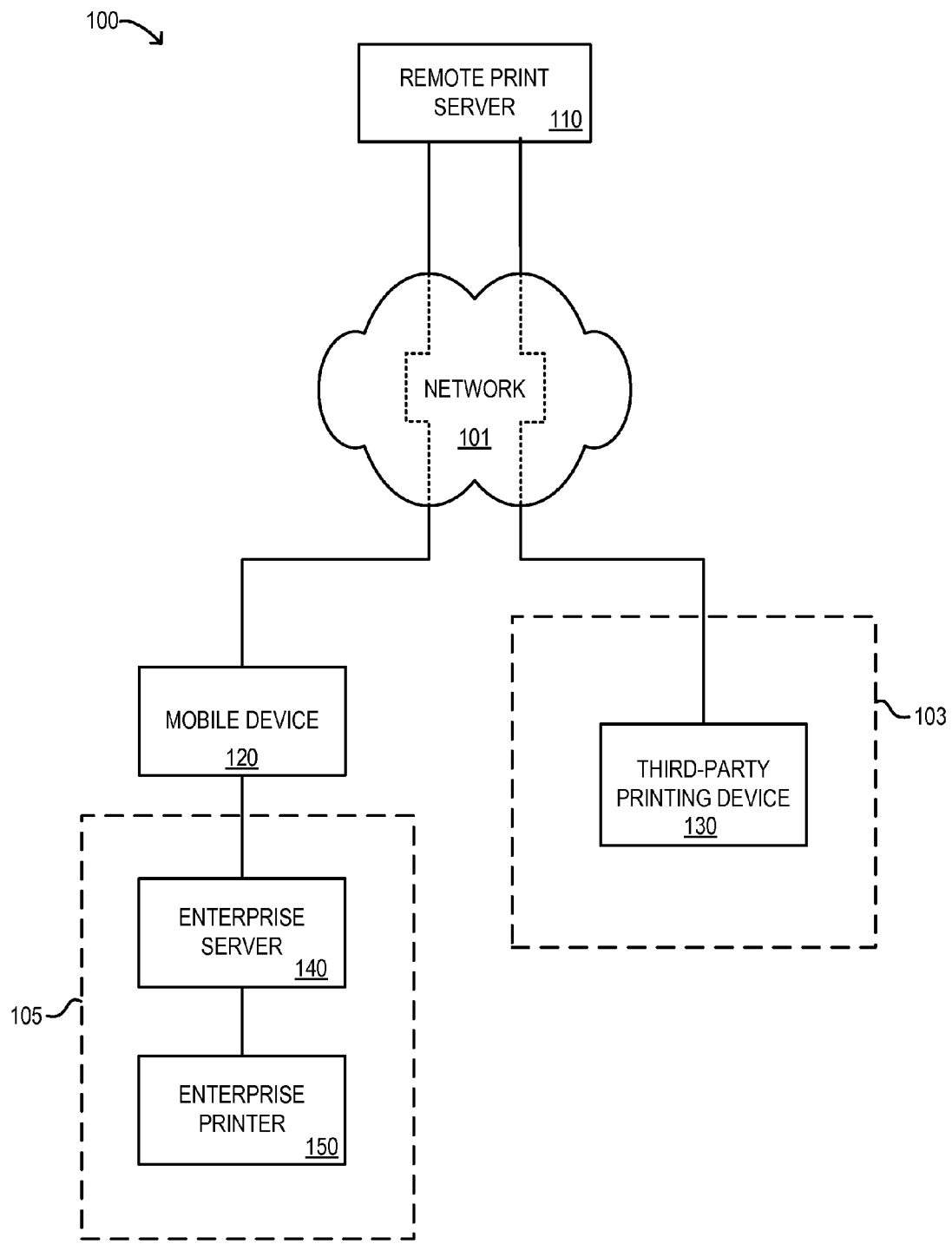
FIG. 1B is a schematic diagram of an embodiment of a remote printing system as it relates to prior art print systems.

Referring now to FIG. 1B, illustrated therein is a configuration of system 100 that shows a mobile device 120 in further communication with an enterprise network 105, which includes an enterprise server 140 that is in communication with an enterprise printer 150. An enterprise network 105 may comprise, for example, any private network (e.g., a private network of a particular organization or company) with which a mobile device 120 is operable to communicate, such as a LAN. For example, the LAN 105 may comprise one or more of peer-to-peer architecture, a ring network, a star network, a token bus network, a token ring network, or another technology. In one example embodiment, if the mobile device 120 comprises a BLACKBERRY mobile device, the enterprise server 140 may comprise a BLACKBERRY server 140 that stores and forwards emails to the BLACKBERRY device, as would be understood by one of ordinary skill in the art. It should be noted that the term email, as used herein, refers to communication or exchange of data using the Simple Mail Transfer Protocol (SMTP) or other appropriate or similar protocol.

FIG. 1B is provided herein to illustrate the usefulness of the systems and methods of the embodiments described herein for users of mobile devices 120 which are already in communication with an enterprise network 105 that includes an enterprise server 140. A user who receives notification of an email containing an attached document the user would like to print may have an option to print the document to the enterprise printer 150. However, as described above, to take advantage of this printing capability the user would first need either to log into the private enterprise network 105 using a desktop computer (e.g., a mobile device 120) to access the email and attachment via the desktop computer and cause either the enterprise printer 150 (or another printer, but only after logging into the network 105 using a desktop or laptop to access the attachment by a device other than the mobile device 120) to print the document, or be limited to printing the document on the enterprise printer 150 previously selected by an IT professional as the enterprise printer 150 for printing documents from the mobile device 120. In contrast, in accordance with embodiments described herein, the user can previously have made arrangements to associate another printing device (e.g., the third-party printing device 130) with himself and thus make the third-party printing device 130 available for printing from the mobile device 120 merely by selecting a "print" option directly from the mobile device 120 (as will be described in more detail herein with respect to FIG. 6 and FIG. 7).

Figure 2:
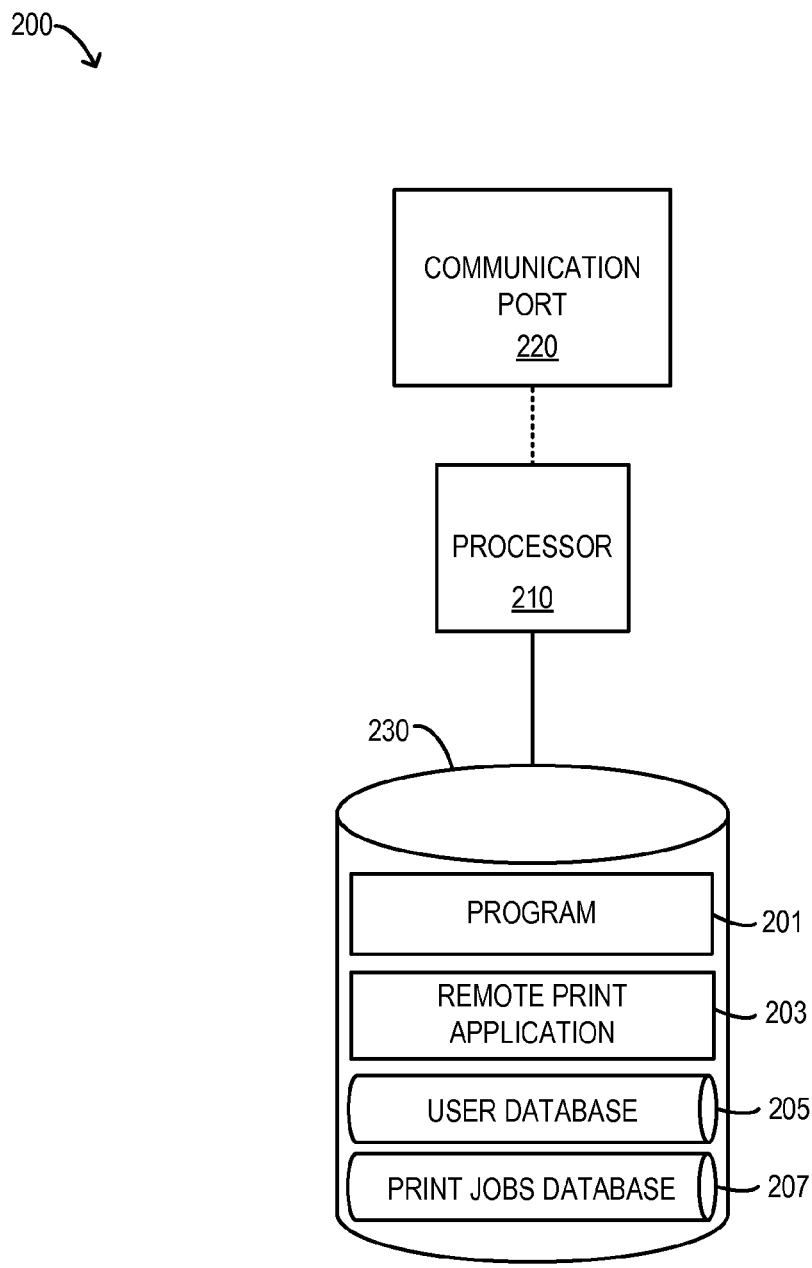
FIG. 2 is a block diagram of an embodiment of a remote print server.

Referring now to FIG. 2, illustrated therein is a block diagram of a remote print server 200 (which may be one embodiment of remote print server 110 of FIG. 1A and FIG. 1B). The remote print server 200 may be implemented as a system controller, a dedicated hardware circuit, an appropriately and/or specially programmed general-purpose computer, or any other equivalent electronic, mechanical or electro-mechanical device. The print server 200 may comprise, for example, one or more server computers operable to communicate with (a) one or more mobile devices, (b) one or more printing devices and/or (c) one or more additional devices (e.g., a remote storage server device for storing data such as documents to be printed via remote print server 200). The print server 200 may be operative to manage the system 100 of FIG. 1A and/or FIG. 1B, or at least to facilitate some functions or procedures described herein. The print server 200, as well as other devices described herein (such as a mobile device 120 and/or a third-party printing device 130), as well as components thereof, may be implemented in terms of hardware, software or a combination of hardware and software.

The print server 200 comprises a processor 210, such as one or more INTEL PENTIUM processors (e.g., a processing device). The processor 210 is in communication with a communication port 220 (e.g., for communicating with one or more other devices, such as one or more mobile devices 120 and/or one or more printing devices 130) and a memory 230. The memory 230 may comprise an appropriate combination of magnetic, optical and/or semiconductor memory, and may include, for example, Random Access Memory (RAM), Read-Only Memory (ROM), a compact disc and/or a hard disk. The processor 210 and the memory 230 may each be, for example: (i) located entirely within a single computer or other device; or (ii) connected to each other by a remote communication medium, such as a serial port cable, telephone line or radio frequency transceiver. In one embodiment, the print server 200 may comprise one or more devices that are connected to a remote server computer for maintaining databases.

The memory 230 (e.g., a non-transitory memory device) stores a program 201 for controlling the processor 210. The processor 210 performs instructions of the program 201, and thereby operates in accordance with at least some of the methods described in detail herein. The program 201 may be stored in a compressed, uncompiled and/or encrypted format. The program 201 furthermore includes program elements that may be necessary, such as an operating system, a database management system and "device drivers" for allowing the processor 210 to interface with computer peripheral devices. Appropriate program elements are known to those skilled in the art, and need not be described in detail herein. The memory 230 further stores a remote print application 203 (which, alternatively, may be part of the program 201) which also may be stored in a compressed, uncompiled and/or encrypted format and include instructions which, when performed by the processor 210, cause the processor 210 to operate in accordance with at least some of the methods described herein. For example, the remote print application 203 may include computer program code that allows the processor 210 to employ the communication port 220 to communicate with a mobile device 110 and/or a third-party printing device 130 in order to, for example:

1. Register a user, including determining a unique user identifier;
2. Determine and store a unique printer identifier for each third-party printing device to be associated with the user identifier (e.g., via a map and/or location-based interface as described herein);
3. Receive a request for a print job (i.e., a printing of a document) from a mobile device associated with a user (e.g., a second user);
4. Determine one or more printers within geographic and/or other location-based proximity to a user (and/or a device of a user, such as the mobile device; e.g., as described in conjunction with FIG. 8 herein);
5. Present a graphical and/or map-based interface (e.g., the interface 860 of FIG. 8) from which a user may select one or more of the proximate printers for execution of the print job;
6. Receive, via the graphical and/or map-based interface, a selection, by a user, of one or more of the proximate printers for execution of the print job (thereby defining a printer associated with a user);
7. Queue a print job for printing by a printing device associated with a user and selected by the user for the print job;
8. Receive, process (e.g., standardize—such as by converting to a PDF and/or other widely-accepted and/or universal document format for printing, compress/decompress, encrypt/decrypt), and/or store a document to be printed;
9. Receive a query from a printing device as to a print queue for the printing device;
10. Instruct the printing device to print a document in accordance with print instructions provided by a user who requested the document to be printed and transmit the document to be printed to the printing device;
11. Cause the printing device not to release and/or print the print job until a user (e.g., a user that requested the document to be printed) and/or a device of the user comes within a predetermined proximity thereof and/or takes an action to trigger printing (e.g., define, receive, and/or provide print release trigger rules and/or identifiers or instructions); and/or
12. Determine a print status of a print job and forward (and/or otherwise provide) such to a mobile device of a user.

According to some embodiments, print server 200 may be operable to perform some of the processes (or portions thereof) described herein. For example, print server 200 may be operable to perform at least a portion of the process 500 (described with respect to FIG. 5), and/or any other process described herein.

According to an embodiment, the instructions of the program 201 and/or the remote print application 203 may be read into a main memory from another computer-readable medium, such from a ROM to RAM. Execution of sequences of the instructions in the program 201 and/or the remote print application 203 causes processor 210 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software.

The memory 230 also stores (i) a user database 205; and (ii) a print jobs database 207. Of course, additional or different tables or databases may be used to store information helpful in carrying out the processes described herein. Examples of such additional databases include, but are not limited to, (i) a separate printing device database or table that stores information regarding the attributes or capabilities of a printing device as well as additional information about the printing device (e.g., the location thereof, number of times used, success rating of jobs transmitted to the printing device, etc.), and (ii) a pre-queue database that stores information about print jobs that have not yet been fully received (e.g., in some embodiments, instructions for how a document is to be printed are received before the document to be printed is received (as is described in more detail with respect to FIG. 5 and FIG. 6) and in such embodiments the instructions may be stored in a pre-queue database until the document is received). In other embodiments, some or all of these functions may be handled by a device distinct from remote print server 200.

Although the databases 205 and 207 are described as being stored in a memory of remote print server 200, in other embodiments some or all of these databases may be partially or wholly stored, in lieu of or in addition to being stored in a memory of remote server 200, in a memory of one or more other devices. Such one or more other devices may comprise, for example, another computing device with which remote server 200 is operable to communicate. Further, some or all of the data described as being stored in the memory 230 may be partially or wholly stored (in addition to or in lieu of being stored in the memory 230) in a memory of one or more other devices. Such one or more other devices may comprise, for example, a remote storage service server (e.g., an online back-up storage server, as would be understood by one of ordinary skill in the art).

In some embodiments the remote print server 200 may be operable to configure a mobile device 120 and/or a third-party printing device 130 remotely, update software stored on either or both such devices and/or to download software or software components to either or both such devices. For example, remote print server 200 may be operable to download (e.g., at the request of a user) software to a mobile device that facilitates the mobile device in using the remote print server to facilitate future print jobs via a third-party printing device 130 by causing the mobile device to generate unique document identifiers for any documents to be printed via remote print 200 and by adding a print option on a menu of the mobile device that, when selected by the user, initiates communication with the remote print server 200. In another example, the remote print server 200 may be operable to download (e.g., at the request of a user) software to a third-party printing device 130 that causes the (e.g., remote) third-party printing device 130 to generate a unique identifier for each printer selected by a user, transmit the unique printer identifier as well as any printer attributes associated with each respective third-party printing device 130 to the remote server 200 and triggers a communication from the third-party printing device 130 to the remote print server 200 to check for a print jobs in a print queue associated with the third-party printing device 130 on the remote print server 200 (e.g., on a periodic, non-periodic, random, continuing or other basis). In such embodiments, also stored in the memory 230 (or in another memory accessible to the processor 210) may be the software for downloading to a mobile device and/or a printing device (e.g., a public and/or third-party printing device). Further, in such embodiments the program 201, the remote print application 203 or another program or application the processor 210 is operable to access may cause the processor 210 to download such software to the appropriate device upon receiving a recognized request for such download.

The remote server 200 (as well as a mobile device 120 and/or a third-party printing device 130) may in some embodiments comprise any device operable to facilitate input. An input device, as the term is used herein, may be any device, element or component (or combination thereof) that is capable of receiving an input (e.g., from a user or another device). An input device may communicate with or be part of another device. Some examples of input devices include: a bar-code scanner, a magnetic stripe reader, a computer keyboard or keypad, a button (e.g., mechanical, electromechanical or "soft", as in a portion of a touch-screen), a handle, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port, and a weight scale. For example, in one embodiment an authorized person may use an input device to program or re-program remote print server 200 to perform a function and/or to write data to one of the databases stored in memory 230.

The remote server 200 (as well as a mobile device 120 and/or a third-party printing device 130) may in some embodiments comprise one or more output devices. An output device may comprise any device, component or element (or a combination thereof) operable to output information from any of the devices described herein. Examples of an output device include, but are not limited to, a display (e.g., in the form of a touch screen), an audio speaker, an infra-red transmitter, a radio transmitter, an electric motor, a dispenser, an infra-red port, a Braille computer monitor, and a coin or bill dispenser.

In some embodiments, a remote print server 200, a mobile device 120 and/or a printing device 130 may comprise components capable of facilitating both input and output functions (i.e., input/output devices). In one example, a touch-sensitive display screen comprises an input/output device (e.g., the device outputs graphics and receives selections from an authorized person).

Figure 3:
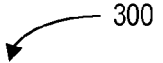
FIG. 3 is an example table of one embodiment of a user database.

Referring now to FIG. 3 and FIG. 4, each of these figures illustrates a respective example structure and sample contents of a database that may be useful in some embodiments. The specific data and fields illustrated in FIG. 3 and FIG. 4, respectively, represents only some embodiments of the records that may be stored in such databases. The data and fields of such databases can be readily modified, for example, to include more or fewer data fields. A single database that is a combination of multiple databases, or a configuration that utilizes multiple databases for a single database illustrated herein may also be employed. Note that in the databases of FIG. 3 and FIG. 4, a different reference numeral is employed to identify each field. However, in at least one embodiment, fields that are similarly named (e.g., a user identifier) may store similar or the same data in a similar or in the same data format.

As will be understood by those skilled in the art, the schematic illustration and accompanying descriptions of data contained in the sample database presented herein is an exemplary arrangement for stored representations of information. Any number of other arrangements may be employed besides those suggested by the table shown. For example, the embodiments described herein could be practiced effectively using more functionally equivalent databases. Similarly, the illustrated entries of the database represent exemplary information only; those skilled in the art will understand that the number and content of the entries can be different from those illustrated herein. Further, despite the depiction of the database as a table, an object-based model could be used to store and manipulate the data types of one or more embodiments and likewise, object methods or behaviors can be used to implement the processes of one or more embodiments.

FIG. 3 is a tabular representation 300 of an example record of an embodiment of user database 205 (e.g., as it may be stored in a memory of a remote print server 200 and/or in a memory of another device). Tabular representation 300 is referred to herein as user database record 300.

The user database record 300 includes a number of example fields or entries, each defining a user who has registered to use the remote printing services of remote print server 110. Those skilled in the art will understand that a user database 205 may include any number of records. The user database record 300 also defines the following example fields (i) a user identifier 305 which uniquely identifies a user registered to use the remote printing services of remote print server 110; (ii) a mobile device identifier 310 which may store one or more of an identifier that uniquely identifies a mobile device of a user and an email address associated with the mobile device (in some embodiments the unique identifier for the mobile device may be the email address associated with the mobile device); (iii) a printing device identifier 315 which uniquely identifies one or more printing devices associated with the user of the subject record; and (iv) one or more print attributes 320 that describe one or more capabilities or attributes of the printing device (in some embodiments, such information may be stored or characterized as restrictions rather than attributes—and in some embodiments may not be necessary such as in the case that documents are standardized and print capabilities are, for example, accordingly irrelevant). It should be understood that additional information may be stored regarding a user. For example, a payment account of a user, a postal or email address (in addition to the mobile device email address, if any), a payment history, a name and/or nickname, demographic information, location information (current, historic, and/or projected), account status and preferences of the user (e.g., map interface and/or document release and/or printing rules) may be stored in some embodiments.

The user identifier 305 may comprise, for example, a user-selected name, nickname and/or password or may alternatively be generated by the remote print server 110 or another device (e.g., the mobile device 120 or the printing device 130). In some embodiments, a user identifier may comprise a combination of two or more of a name, password, email address and device-generated identifier (in which embodiments the appropriate combination of data may be stored as a user identifier in one or more fields).

The mobile device identifier 310 may comprise, for example, an email address used by the remote print server 200 to communicate with the mobile device. In one embodiment, the mobile device identifier may comprise a unique identifier generated by the mobile device upon installation of appropriate software downloaded from the remote print server 200. In one embodiment, the mobile device identifier may include information about the mobile device (e.g., the manufacture and/or model of the mobile device and/or a Media Access Control (MAC) address). As with the user identifier, if the mobile device identifier includes more than one piece of data, the combination of such data may be stored in one or more fields.

The printing device identifier 315 may comprise, for example, a unique identifier generated by the printing device (e.g., in embodiments in which the printing device comprises a computing device operable to direct a printer to print a document) upon downloading of the appropriate software from the remote print server 200. In another embodiment, the printing device identifier 315 may include information about the printing device (e.g., the name of the manufacturer and/or model). As with the user identifier, if the mobile device identifier includes more than one piece of data, the combination of such data may be stored in one or more fields.

The print attributes 320 comprise indications of the relevant characteristics, capabilities or functionality of the subject printing device. For example, an attribute may be whether the printing device supports duplexing, color printing, adjustment in orientation, printing to A4 size paper, etc. It should be noted that in some arrangements, each such attribute being tracked by the system 100 may be stored as a separate field that has either a "yes" or "no" noted in each field associated with a subject printing device, to indicate whether the printing device possesses the particular attribute.

In some embodiments, additional information for each printing device may be stored. For example, a location (e.g., an IP address or a geographical location address and/or identifier) and/or nickname or other name easily recognizable by the user may be stored (e.g., "kitchen printer" or "home office printer").

In some embodiments, the information about printing devices that users have associated with themselves (and/or that have been associated with the user by the system—e.g., based on geographic proximity and/or other preferences) may be stored in a separate table or database. For example, in one embodiment the user database 205 may store only the printing device identifiers 315 of the printing devices associated with a particular user 305. Another "printing device" database may then store, for each printing device so associated, the relevant and desirable information for each printing device.

In some embodiments, encryption techniques are used to encrypt a document for printing such that the document is encrypted as it is received by the remote print server 200 (or, alternatively, before it is received by the remote print server 200). Such embodiments are described in more detail with respect to FIG. 5, FIG. 6, and FIG. 7 herein. However, in such embodiments, the user database 205 may store additional information relevant to the encryption techniques, such as the public key associated with a printing device (the printing device having previously generated a public/private key pair and transmitted the public key to the remote print server 200).

Referring now to FIG. 4, illustrated therein is a tabular representation 400 of an embodiment of a print jobs database 207 (e.g., as it may be stored in a memory of a remote print server 200 and/or in a memory of another device). Tabular representation 400 is referred to herein as print jobs database 400.

The print jobs database 400 includes a number of example fields or entries, each defining a print job (a printing of a document) being facilitated by the remote printing services of remote print server 110. Those skilled in the art will understand that a print job database 400 may include any number of records. The print jobs database 400 also defines the fields for each of the records, the example fields being (i) a printing device identifier 405 which indicates the printing device on/via which the subject print job is to be printed; (ii) a document identifier 410 which uniquely identifies the document to be printed; (iii) print instructions 415 which comprise instructions from the user who requested the subject print job as to how the printing is to be done (e.g., in color, two-sided, landscape orientation as opposed to the portrait orientation in which the document is configured); (iv) print/release trigger(s) 417 which indicate any triggers or rules regarding how or when a print job should be released and/or executed (e.g., such as at a public/third-party printer, to facilitate secure delivery of the print job to the intended user); and/or (v) the print/release status 420 of the print job.

It should be noted that in some embodiments the print jobs database 400 may further store a copy of the document to be printed (e.g., in standardized—e.g., PDF, and/or encrypted form). In other embodiments, the document may be stored in another location (e.g., at another server, such as an online storage service available from third parties). In such embodiments, the print jobs database 400 may further store a link or file path to the location in which the document is stored and/or another identifier or name for the document (e.g., one assigned by the third-party remote storage service).

In some embodiments, a document of a print job may be encrypted such that personnel/employees of the entity operating the remote print server 200 may not be able to read the documents. In such embodiments, the print jobs database may store additional information, such as an encrypted version of the document (as already described above) and an encrypted password corresponding to the document (in some embodiments the encrypted version of the password and the encrypted version of the document being transmitted to the appropriate printing device for decryption by the printing device).

Figure 5:
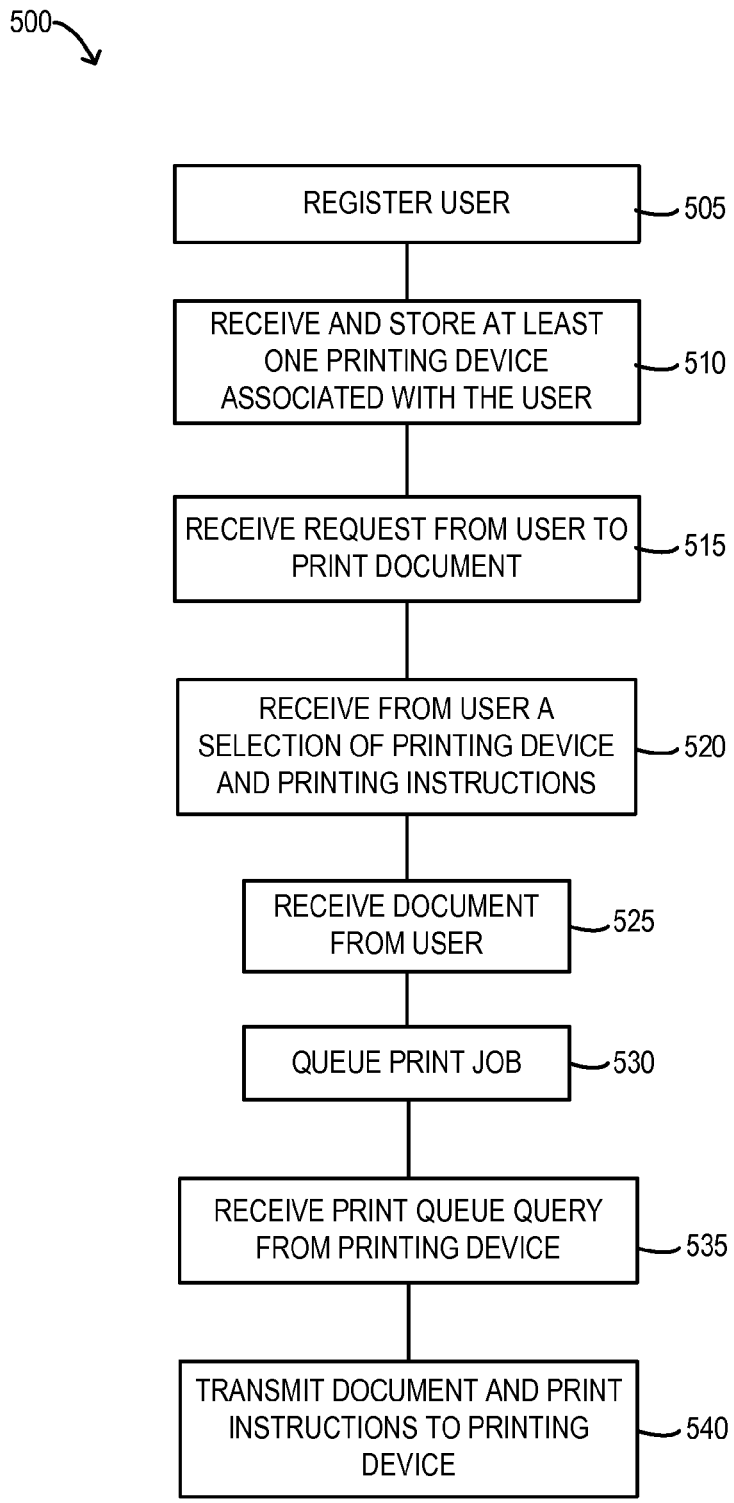
FIG. 5 is a flowchart illustrating an example process that may be performed at least by a remote print server in accordance with an embodiment.

Referring now to FIG. 5, illustrated therein is a flowchart of a process 500 consistent with some embodiments. It should be noted that process 500 is exemplary only and should not be construed in a limiting fashion. For example, additional and/or substitute steps to those illustrated may be practiced within the scope of the present embodiments and in one or more embodiments one or more steps may be omitted or modified. In one embodiment, the process 500 is performed by remote print server 110.

In step 505 a user is registered to use the printing services of remote print server 200. Such registration may include, for example, receiving a request from a user to download the appropriate software to a printing device and facilitating the download of such software. In some embodiments such registration may further include receiving a unique identifier (e.g., username and password or other login credentials to be used to uniquely identify the user to the remote print server 200) from the user, which may be user selected/input in response to a query or automatically generated on behalf of a user by a device (e.g., by printing device 130 or remote print server 110). In some embodiments, installation of the appropriate software to a printing device may also include installation on the printing device of appropriate third party software or libraries, such as the ORACLE OUTSIDE IN file viewing technology, in order to allow viewing and printing of documents in file formats not otherwise supported by the printing device (e.g., in order to allow the printing device to view and print a PDF or EXCEL file, even if the printing device does not otherwise have software for viewing PDF or EXCEL files installed thereon). In some embodiments, registration of the user may further include receiving payment information from the user and/or setting up a financial/payment account associated with the user to track payments made by the user.

In step 510, an indication of at least one printing device to be associated with a user for use by the user in printing documents from a mobile device is received. Such an indication may include one or more of the following: (i) a unique printing device identifier for each printer to be associated with the user; (ii) a location of each such printing device; (iii) a nickname or user-friendly or user-recognizable name for each such printing device (e.g., "kitchen printer" or "home office printer"); (iv) one or more attributes associated with each printing device so uniquely identified; and (v) a public key for each printing device so uniquely identified, to be used to encrypt documents for printing by the printing device. According to some embodiments, the receiving at 510 may include and/or be substituted with a determining of the at least one printing device to be associated with the user. In the case that the user desires to use a public, third-party, and/or quasi-public or other printing device (e.g., not owned and/or operated by the user and/or an employer of the user), for example, a map interface may be provided (e.g., the interface 860 of FIG. 8) showing the user available printing devices in certain geographic areas, such as based on the user's home or office address, and/or based on a current (or expected or scheduled) location of the user. Available printing devices may be searched, for example, to determine which subset of available devices are in closest proximity to the user (and/or based on other location-based criteria defined by the system and/or by the user—e.g., a user preference).

In some embodiments, process 500 may further include transmitting an indication of the one or more third-party printing devices 130 associated with a user to a mobile device 120 (e.g., for local storage on the mobile device 120) and/or updating such information as it is changed by a user. In one embodiment, the remote print server 200 may update or refresh information about printing devices associated with a user automatically. For example, the remote print server 200 may be programmed to automatically, periodically, non-periodically, upon a triggering event or otherwise poll a user, a printing device or other device (e.g., a computing device associated with a user) to update, refresh, or validate such a list. In another embodiment, a printing device or other computing device associated with a user may be programmed to initiate communication with the remote print server 200 to communicate changes to such information or to validate such information (e.g., automatically, periodically, non-periodically, upon a triggering event or otherwise). In some embodiments, the indication(s) of the one or more third-party printing devices 130 may be provided via a graphical and/or map-based interface such as the interface 860 of FIG. 8 herein.

In step 515, a request to print a document is received from a user (e.g., via a mobile device and/or via a graphical and/or map-based interface). In some embodiments, such a step may be preceded by a step of receiving a registration or indication of a particular mobile device being associated with a particular user (e.g., which may include a unique identifier for the mobile device and/or an email address for use in communicating with the mobile device). In some embodiments, the request to print a document may include the unique user identifier of the user making the request and/or an identifier of the mobile device via which the request is being made. Such user identification information may be manually entered by the user (e.g., into a mobile device, which transmits the information to the remote server 200) upon each print request, upon some print requests, or upon the first print request (the mobile device storing such user identification information from thereon after and automatically transmitting such to the remote print server 200 upon subsequent print requests). In some embodiments, process 500 may include verifying or authenticating such user identification information prior to a user being allowed to proceed further with a print request.

In step 520, a selection of the printing device the user desires to cause to print the document is received (e.g., via the interface 860 of FIG. 8 herein) along with print instructions (in some embodiments the print instructions may be received separately from the selection of the printing device). In some embodiments, this step of receiving the selection of a printing device may be preceded by a step of retrieving the printing devices associated with the user (based on the user identifier and/or location associated with the user) and transmitting an indication of these printing devices to the mobile device, for selection by the user. As described above with respect to step 510, in some embodiments this information (of available printing devices) may already be locally stored on the mobile device and need not be transmitted upon a request to print a document being received. The print instructions may comprise, for example, whether the document is to be printed in color, two-sided or one-sided, etc. In some embodiments, the print instructions may need to be verified against the printing device attributes of the printer selected, to ensure that the printing device selected is operable to support the print instructions.

In some embodiments, the print instructions further include a unique identifier of the document to be printed (as will be described in more detail with respect to FIG. 6). In some embodiments, the print instructions comprise XML print instructions which are received by the remote print server 200 via HTTP or HTTPS. According to some embodiments, the print instructions (defined by the system and/or by the user) may also or alternatively comprise indications and/or definitions of one or more printing and/or release triggers, rules, and/or criteria. The printing device may be instructed, for example, not to release or print a print job until a user and/or associated devices comes within a predetermined proximity thereof (e.g., to ensure that the print job is provided to the correct user and/or to prevent or minimize the potential of other individuals from acquiring or viewing—accidentally or intentionally—the print job).

In step 525, the document to be printed is received. In some embodiments, this may entail receiving an email message (e.g., from the mobile device or a server on which the original email is stored) with the document included as an attachment to the email. In some embodiments, such an email may include a unique document identifier (e.g., the document identifier previously received as part of the print instructions in some embodiments, to link the document in the email to the print instructions). In other embodiments, the document may be received via protocols such as HTTP, HTTPS, FTP or a similar protocol for transmitting information via the Internet or other similar network.

In some embodiments, the document may be standardized and/or encrypted by the mobile device prior to being transmitted to the remote print server 200, thus the step 525 of receiving the document may comprise receiving the standardized and/or encrypted (and/or otherwise processed) document (along with, in some embodiments, an encrypted password for use in decrypting the document). In some embodiments, the document may be encrypted by the remote print server 200 upon being received. In some embodiments, process 500 may include additional steps to be performed upon receiving a document, such as generating a random password and encrypting the received document using the password. The remote server 200 may then encrypt the password using a public key previously stored in association with the printing device by which the document is to be printed (received from the user in step 520), storing the encrypted document and encrypted password and discarding the original, unencrypted versions of the document and the password.

In step 530 the document is queued for printing. For example, a new entry or record may be created in a print jobs database 207. In some embodiments, each printing device 130 has associated therewith its own print queue and the print job is added to the particular print queue of the appropriate printing device. In some embodiments, the print job may be placed in the print queue with an 'on hold' status, such as in the case that a print release trigger identifier is utilized to protect the privacy of the document. The 'on hold' status may later be removed, causing the print job to be queued, spooled, and/or printed, for example, upon receipt (e.g., by the remote print server 110, 200 and/or by the third-party printing device 130) of the print release trigger identifier from, e.g., the user/mobile device 120.

As described above, in some embodiments the print instructions and selected printing device are first received (e.g., via HTTP or HTTPS) by the remote print server 200 and the document to be printed is subsequently received via a separate email communication. In such embodiments, a pre-queue of partially communicated print jobs may be stored, with the print instructions and document identifier but without the document itself having yet been received. In such embodiments, process 500 may include not only updating such a pre-queue database upon receiving print instructions but also moving or copying data (e.g., print instructions and selected printing device) from the pre-queue database to the print jobs database 207 once the document is received. In embodiments in which the document is received along with the print instructions (e.g., all via HTTP or HTTPS), such a pre-queue database may not be desirable.

In some embodiments, documents to be printed are stored on a third-party server (e.g., a backup storage service available via the Internet) in addition to or in lieu of being stored at the remote print server 200. In such embodiments, process 500 may further include transmitting the document to such a third-party service and receiving another document identifier (e.g., one generated by the third-party service) for the document and storing it in association with the document identifier received from the mobile device. In some embodiments, a file location or file path may be determined for the document and stored in association with the document identifier (e.g., in a print queue database 207).

In step 535, a query is received from a printing device as to whether there are currently any print jobs pending for the printing device. Such a query may include, in some embodiments, a unique printing device identifier associated with the printer and/or a user identifier.

In some embodiments, the remote print server 200 does not transmit a document for printing to a printing device unless and until the printing device first queries the remote print server 200 (thus obviating any problems with getting through a firewall of the printing device or other communication obstacles associated with a "data push" arrangement). Thus, in some embodiments the remote print server 200 "waits" or "listens" for queries from printing devices and, upon receiving such a query, determines whether there are any pending or uncompleted print jobs associated with the appropriate printing device (e.g., by querying the print jobs database 207 based on the printing device identifier received as part of such a query). Of course, in some embodiments the remote print server 200 may transmit a document to be printed to a printing device selected by a user without first waiting for a print queue query from the printing device (e.g., using a "data push" arrangement).

In step 540, the document to be printed is transmitted to the printing device selected by the user for the printing of the document (which, in some embodiments, may be the printing device from which a query was received in step 535), along with any print instructions associated with the document. It should be understood that in some embodiments print instructions may not be preferred (e.g., if the printing has limited attributes such as only printing in black and white and not supporting duplexing, transmitting the document may be sufficient and it may be understood by the printing device that the document is to be printed via default settings). Transmitting the document may comprise transmitting an encrypted version of the document (e.g., along with an encrypted password useful for decrypting the document). The document may be transmitted, for example, via email as an attachment or directly via HTTP or HTTPS.

In some embodiments, either or both of the remote print server 200 and/or a third-party printing device 130 can be configured to print a document using a fax machine, wherein the data is transmitted via Voice-Over-IP (VOIP) or standard telephone connection.

In embodiments in which the document is stored at a third-party storage service, step 540 may comprise retrieving the document from the third-party storage service for forwarding to the printing device or providing the document identifier (provided by the third-party service for retrieval of the document from the third-party service) to the printing device.

In some embodiments, the process 500 may include additional steps, such as verifying that the print job was printed successfully by checking for a successful print status (or printing error) message from the printing device and forwarding such message to the user and/or mobile device from which the print request was received. In some embodiments, if an error is determined in the printing job, the user may be presented with an option to request the document be reprinted (to the same or different printing device, using the same or different print instructions). In some embodiments, process 500 may further include updating the print jobs database to reflect a successful printing of a print job.

According to some embodiments, the process 500 may comprise implementation of one or more print release triggers, rules, and/or processes. As described herein, for example, a print job (even if queued, for example) may be reserved, held, and/or put on hold or otherwise secured and/or kept private until a user (e.g., that requested the print job) comes within some proximity to the third-party printing device 130 and/or printer associated therewith. In some embodiments, the user may (e.g., by utilizing the mobile device 120) access a website, utilize a mobile application, send a text message, e-mail, and/or access a GUI, for example, and provide an indication of the print job, document identifier, and/or user identifier. Such accessing and/or providing of an identifier may cause a release and/or printing of the desired document. In some embodiments, the identifier may comprise a print release trigger that causes a "connector", that manages and/or enables communications between the third-party printing device 130 and/or printer with the Internet (and/or other network; e.g., 'the cloud'), to allow/cause the printing of the print job. The user may, for example, provide the identifier and/or other release command once the user is within proximity to the third-party printing device 130 and/or printer, and/or upon an agent (e.g., friend, relative, etc.), preventing others from viewing and/or obtaining the print job, while requiring only minimal input from the user to gain access to the print job/document. Such a remote identifier print release process may, for example, be particularly advantageous for entities and/or sites with third-party printing devices 130 and/or printers that are not equipped with keypads enabled to accept print release codes.

Figure 6:
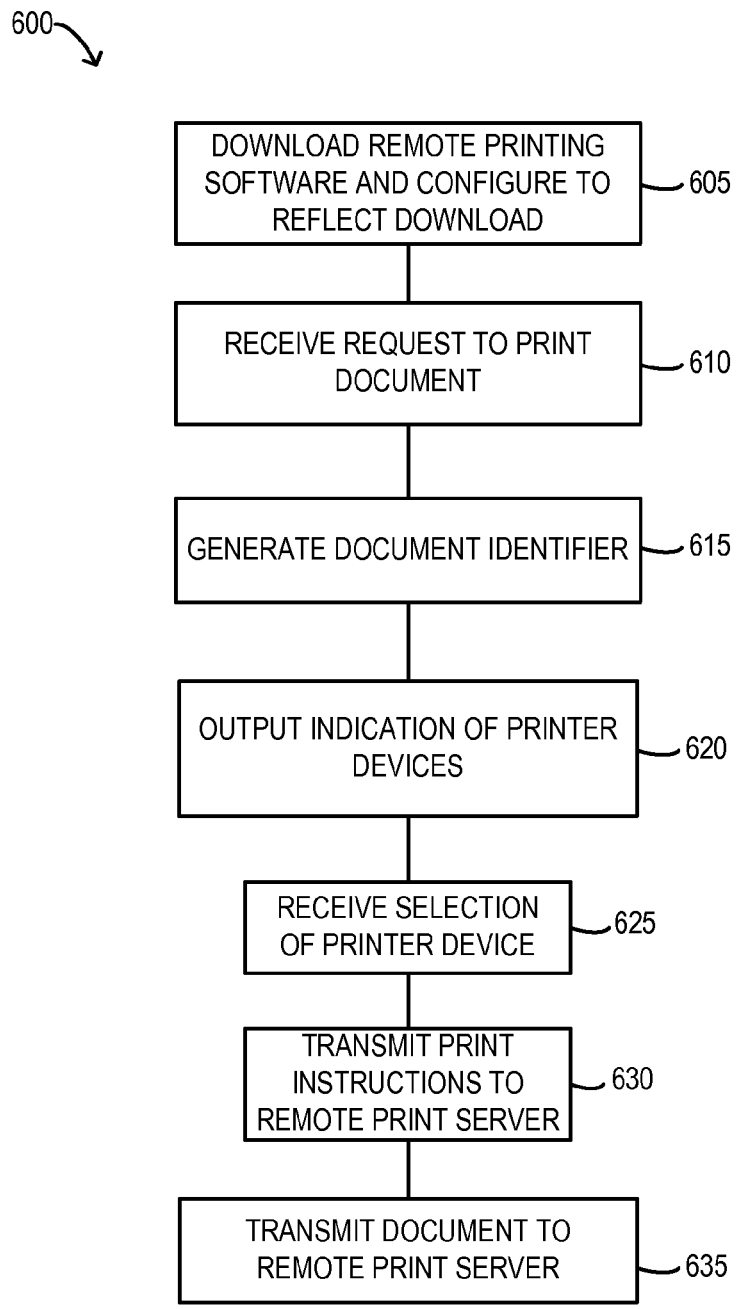
FIG. 6 is a flowchart illustrating an example process that may be performed by a mobile device in accordance with an embodiment.

Referring now to FIG. 6, illustrated therein is an example process 600 consistent with some embodiments. Example process 600 may be performed, for example, by a mobile device 120.

In step 605, the appropriate software for facilitating remote printing in accordance with the embodiments described herein is downloaded to the mobile device (e.g., when the user of the mobile device selects the appropriate link on a web page associated with the remote print server 200). Upon the software being downloaded and installed, the mobile device is configured such that a print option is added to a menu of the mobile device, a graphical and/or map-based printing interface is provided (e.g., the interface 860 of FIG. 8 herein), and/or a program is installed that runs in the background of the mobile device any time the mobile device is turned on. In some embodiments, the software may prompt the user for a user identifier previously registered with the remote server 200 (e.g., upon installation of the software, upon each startup of the mobile device and/or upon the user requesting to print a document via the remote print server 200).

In step 610, a request to print a document is received from a user (e.g., the user selects "print" from the menu, previously installed upon installation of the software). The request may further include a user identifier (e.g., received upon prompting the user for the user identifier upon the user selecting the "print" option). The request to print the document is associated with a particular document (e.g., the request is received once the document is open and active on the mobile device or when the email having the document as an attachment is highlighted).

In step 615, a document identifier is generated using the software previously downloaded and installed in step 605. An indication (e.g., list and/or graphical and/or map-based interface such as the interface 860 of FIG. 8) of printing devices by which the document can be printed is then output, in step 620, to the user via an output device (e.g., screen) of the mobile device. As described above, in some embodiments the list of available printing devices may be stored locally on the mobile device, in which case process 600 may include retrieving such information and providing it to the user. In other embodiments, process 600 may include communicating with the remote server 110 to receive an indication of one or more printing devices available for use in printing the document, upon receiving the request to print the document in step 610, and then outputting this received information to the user. In some embodiments, the list and/or indication of available printing devices may be sorted, ranked, filtered, and/or otherwise managed and/or presented in accordance with system and/or user-defined rules, preferences, and/or criteria (as described in more detail with respect to FIG. 8 herein).

In step 625, a selection of the printing device to be used to print the document is received from the user (e.g., the user selects the printing device via an input device of the mobile device, such as by touching an icon on a map-based interface, the icon representing the location of the desired printing device). It should be noted that in some embodiments only a single printing device may be associated with a user and in such embodiments it may not be preferred to present the user with a selection of printing devices and receive a selection. Rather, the request to print may inherently be associated with the printing device with which the user is associated. The step 625 may further include receiving print instructions for printing the document via the selected printing device (e.g., should the document be printed in color, be printed as two-sided, etc.).

In step 630, the print instructions are transmitted to the remote print server 200. In some embodiments the print instructions are transmitted in XML or JSON format (or a similar format) via HTTP or HTTPS (or another similar protocol). In other embodiments, the print instructions may be transmitted via email. In some embodiments, the print instructions include the document identifier generated in step 615 and/or the identifier of the printing device determined in step 625.

In step 635, the document to be printed is transmitted to the remote print server 110. For example, the document may be transmitted via email as an attachment or directly via HTTP or HTTPS (or a similar protocol). In some embodiments, transmitting the document may comprise instructing a server on which the document is stored (directly or as an attachment to the email) to transmit the document to the remote print server 110. In some embodiments, the document identifier generated in step 615 is transmitted along with the document (e.g., if the document is transmitted as an attachment to an email, the document identifier may be included in the email).

In some embodiments, the mobile device may be operable to encrypt the document prior to transmitting it to the remote print server 110. In such embodiments, process 600 may further include generating a password, encrypting the document with the password and encrypting the password using a public key previously received from the remote print server 110, and transmitting the encrypted password and encrypted document to the remote print server 110.

In some embodiments, process 600 may include additional steps, such as awaiting a successful print confirmation from the remote print server 110, presenting the user with an option to request a re-print (e.g., in the case of an error in the original printing request, to the same or different printing device and/or using the same or different print instructions), and/or triggering release and/or printing of the document, such as by establishing Near-Field Communications (NFC) and/or other local communications with the printing device and/or otherwise providing and/or transmitting data that indicates that the user is proximate to the printing device (e.g., providing GPS and/or other location-based data to the remote print server 110 and/or printing device), or otherwise intends to trigger the printing and/or release of the document.

Figure 7:
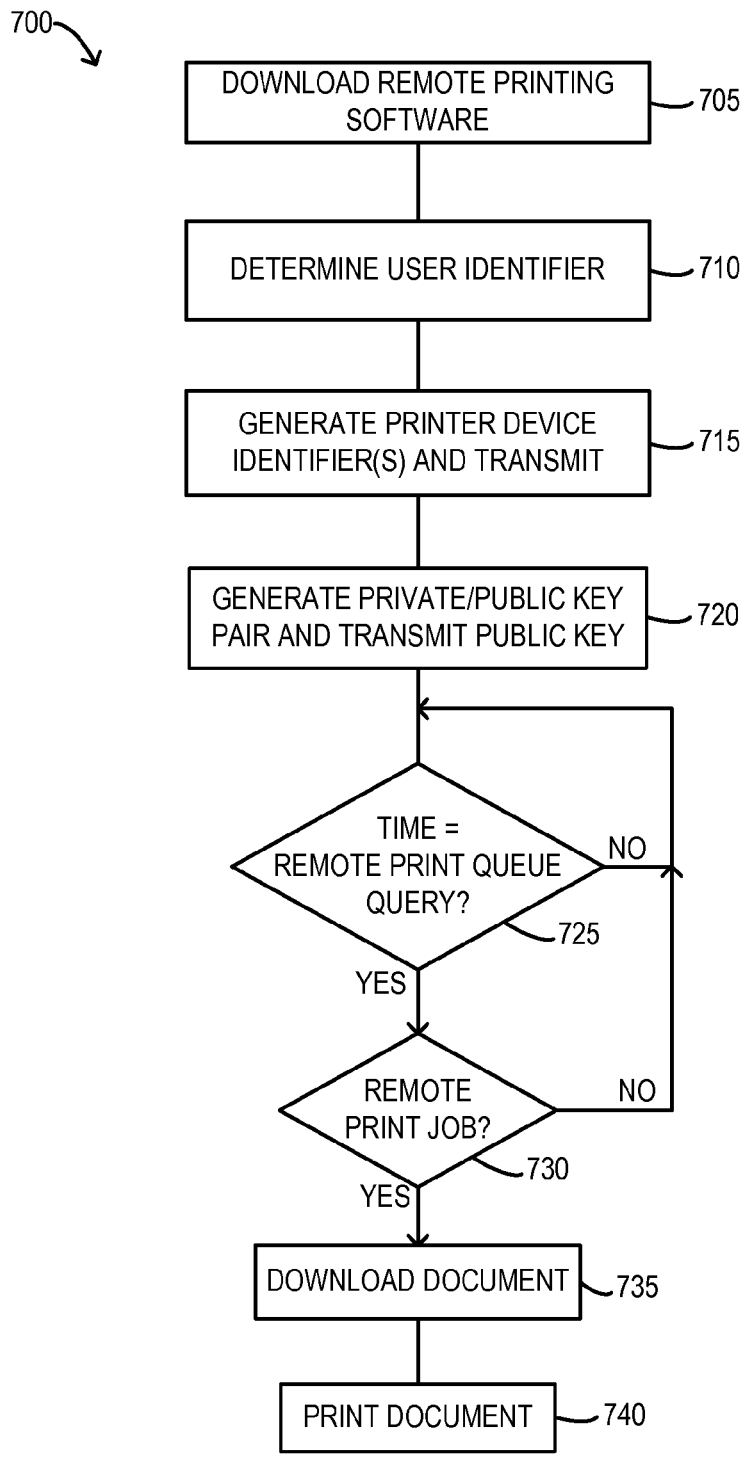
FIG. 7 is a flowchart illustrating an example process that may be performed by a printing device in accordance with an embodiment.

Referring now to FIG. 7, illustrated therein is a flowchart of an example process 700. Example process 700 may be performed, for example, by a third-party printing device 130.

In step 705, the appropriate software for facilitating remote printing in accordance with the methods described herein is downloaded and installed (e.g., upon a user selecting an appropriate link on a web site associated with remote print server 110). In some embodiments, installation of the software may comprise installation of viewing technology that allows the printing device to view and print documents in file formats not otherwise supported by the printing device. Installation of the software may also trigger the generation of a unique identifier for the software and/or the printing device on which the software is installed. Installation of the software may, in some embodiments, cause it to run in the background whenever the printing device is on and, in some embodiments, to query the remote print server 110 for print jobs (e.g., periodically, continuously, randomly or on some other basis). The software can be designed to run constantly, continuously, intermittently, periodically, and/or on a scheduled basis, and can be configured to consume minimal computing resources. The software can be configurable by the user, allowing the user to perform tasks such as adding or removing printing devices to which the program has print access, specifying attributes and/or restrictions (for example, time of printing, color availability, geographic proximity, etc.) on such access, and the like. In an embodiment, the software installed on a printing device (and/or the software installed on a mobile device) is a natively written program in a language such as, for example, C++, an applet software program, a javascript software program operating in an internet browser window, or other program. In an embodiment, the software installed on a printing device is a web-based program that is continuously and/or periodically communicating with a web site associated with the remote print server 110 to check for new print jobs.

In step 710, a unique user identifier may also be determined. For example, when the software installed in step 705 is first run, it may prompt the user for a user identifier (e.g., prompt the user to type in a user name and password) or generate a unique user identifier for the user. The user identifier is then uploaded or transmitted to the remote print server 110.

In step 715, a unique printing device identifier may be generated for each printer to be associated with the user. In some embodiments, process 700 may comprise querying the printing device on which it is installed for a list of the printers associated therewith (in embodiments in which the printing device comprises a computing device such as a desktop or laptop computer that directs one or more printers to print documents). The list of available printers may then be presented to the user (e.g., via an output device of the printing device, such as a screen, and/or via an interface such as the interface 860 of FIG. 8 herein) and the user may select the printing devices (s)he wishes to associate with the user identifier determined in step 710. A unique printer identifier may then be generated for each printer so selected. Of course, if the printing device is a printer itself, not associated with other printers it may select, step 715 may simply comprise generating a printing device identifier for the printing device on which the software is installed.

In step 720, a public/private key pair is generated (in embodiments which employ encryption techniques). The public key may then by uploaded or transmitted to remote server 200. Of course, it should be understood that the encryption techniques described herein are exemplary only and other encryption and/or privacy measures would be understood by one of ordinary skill in the art.

In step 725, it is determined whether the current time equals a time at which the remote print server 110 should be queried for any pending remote print jobs (e.g., in one embodiment such a query is performed once every minute, in which embodiment step 725 may comprise determining whether one minute has passed since the previous such query). If it is determined in step 725 that it is not time to query the remote print server 110, process 700 continuously loops to step 725 until an affirmative answer is determined. Otherwise, the process 700 continues to step 730, in which it is determined by communicating with remote print server 110 whether there is a pending print job at the remote print server 110 for the printing device. If the answer is yes, the process continues to step 735. Otherwise, the process loops back to step 725.

In step 735, the document to be printed is downloaded. For example, the document may be downloaded via HTTP or HTTPS (or a similar protocol). In another example, the document may be received as an attachment to an email. In some embodiments, step 735 may further comprise receiving any print instructions associated with the document.

As described above, in some embodiments steps 725 and 730 may not be preferred. For example, in an alternate embodiment the remote print server 110 may simply contact the printing device and transmit any document to be printed (e.g., a standardized and/or universal file format version thereof) upon a print job for the document being received.

In some embodiments, step 735 may comprise receiving the document in encrypted form and an encrypted password used to encrypt the document. In such embodiments process 700 may further comprise decrypting the password using the private key generated in step 720 and using the decrypted password to decrypt the document.

In some embodiments, process 700 may include utilizing a file viewing technology downloaded as part of step 705 to open the file.

In step 740, the document is printed. If the printing device performing the process 700 is a printer, step 740 may simply comprise activating the appropriate components of the printer to print the document. If the printing device performing the process 700 comprises a desktop, laptop or other computer directing one or more printers, step 740 may comprise directing an appropriate printer (as identified in printing instructions received in association with the document, e.g., as part of step 735) to print the document in accordance with the print instructions. In some embodiments, such as in the case the printing instructions define one or more printing and/or document release triggers, rules, and/or criteria, the printing at 740 may only be conducted once it is determined that such triggers, rules, and/or criteria are satisfied. The printing device may receive a direct indication from a mobile device of the user regarding a proximity of the user/user device to the printing device, for example, and/or may receive an indication of the distance and/or proximity of the user/user device from the print server (or a third-party system or device such as a cell service provider).

Figure 8:
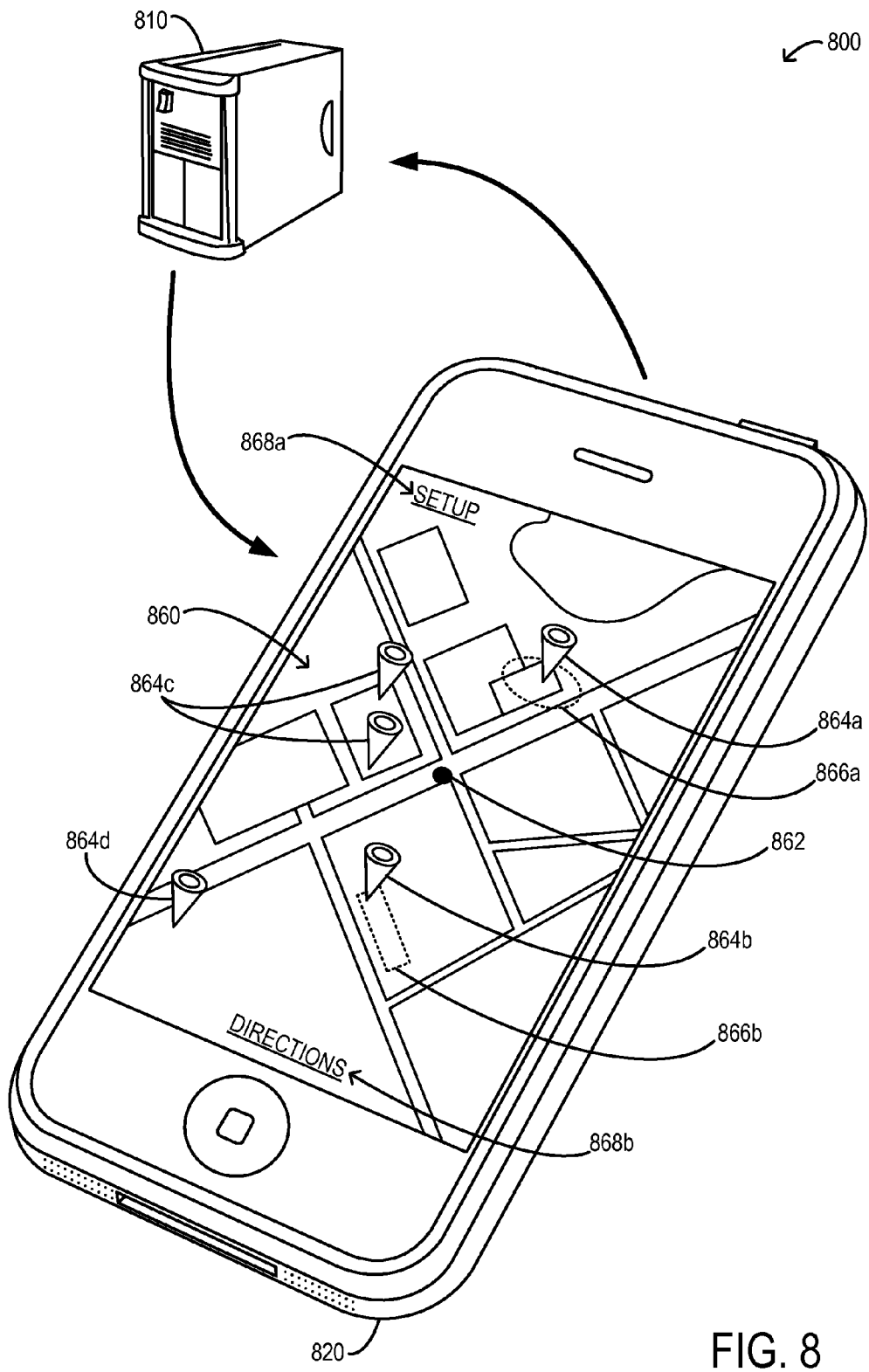
FIG. 8 is a diagram of a system according to some embodiments.

Referring now to FIG. 8, a system 800 according to some embodiments is shown. The system 800 may comprise, for example, a server 810 and a mobile device 820 in communication with the server 810 (e.g., via one or more networks such as the network 101 of FIG. 1; not explicitly shown in FIG. 8). In some embodiments, the components 810, 820 of the system 800 may be similar in configuration and/or functionality to similarly named and/or numbered components as otherwise described herein. According to some embodiments, the mobile device 820 may comprise (e.g., include, display, and/or otherwise display or provide) a map-based (and/or graphical) interface 860. In the case that the mobile device 820 is utilized (e.g., by a user; not shown) to effectuate remote and/or mobile printing of a document as described in accordance with embodiments herein, for example, the interface 860 may provide a mechanism for the user to choose, select, and/or otherwise designate or define one or more desired locations and/or devices via which a document is desired to be printed.

The interface 860 may, for example, display or include an icon (or other identifier) 862 representing a location associated with the user. The location associated with the user may, in some embodiments, comprise a predetermined and/or pre-selected location associated with the user such as a home, work, and/or other location. According to some embodiments, the location may comprise a current location of the user, such as may be determined via user input, GPS, NFC, cell-tower triangulation, signal triangulation, Wi-Fi® discovery and/or triangulation, etc. In some embodiments, the interface 860 may comprise one or more icons (or other identifiers) 864 representing locations of available printing devices such as public, third-party, and/or quasi-public printers. A first printer device icon 864a, a second printer device icon 864b, a set of third printer device icons 864c (e.g., grouped together in some embodiments because the respective printing devices are located in the same building/establishment), and/or a fourth printer device icon 864d may be displayed, for example, based on proximity of the user/user device (represented by the user icon 862) to the various printing devices. In some embodiments, the interface 860 may provide other information such as printing/release boundaries 866. In the case that print jobs sent to the first printing device represented by the first printing device icon 864a are set not to be printed or released until a requesting user is within a certain proximity or range from the printing device, for example, a first printing/release boundary 866a may be displayed. As depicted, the first printing/release boundary 866a may define a radius emanating from the location of the first printing device icon 864a (and/or the first printing device), which may be defined and/or expressed in terms of distance and/or time (e.g., Estimated Time of Arrival (ETA)).

According to some embodiments, a second printing/release boundary 866b may be displayed with respect to the second printing device icon 864b. As depicted, the second printing/release boundary 866b may be expressed in terms of building and/or other boundaries—e.g., printing and/or document release may be triggered upon the user entering the building/store/room in which the second printing device is located. In some embodiments, the interface 860 may comprise one or more links 868. A first link 868a titled "SETUP", for example, may be utilized by a user to select and/or define various preferences, rules, triggers, and/or other characteristics of the interface 860 and/or with respect to the various available printing devices. The printing/release boundaries 866a-b may be viewed, selected, and/or defined by the user, for example, by activating the first link 868a. In some embodiments, the user may utilize the first link 868a to define or select criteria which govern how printing devices (and/or respective icons 864) are presented on the interface 860. A user may, for example, set a geographic range such as "<5 miles from current location", may choose a type of printing service establishment such as "Kinkos®", "Walgreens®", "Public Library", etc., and/or may choose various printer and/or service location attributes such as "currently open", "can print photos", or "no fee", which the system 800 and/or the server 810 may utilize to filter, rank, sort, and/or otherwise present or manage available printing device information. In some embodiments, the interface 860 may comprise a second link 868b titled "DIRECTIONS" that may, for example, incorporate routing functionality that facilitates navigation of the user to the desired and/or selected printing device.

In some embodiments, the user may select a printing device icon 864 from the interface 860 and an indication of the selection may be transmitted and/or provided to the server 810 (e.g., via a transmission from and/or other communication link with the mobile device 820). The server 810 may receive such an indication, for example, and may utilize the indication to associate the desired printing device with the user and/or with a specific print job, as described herein. According to some embodiments, location information from the mobile device 820 may be sent and/or provided to the server 810 (e.g., via a transmission from and/or communication session with the mobile device 820). The server 810 may, in some embodiments, utilize the location information to search for, look up, and/or otherwise determine a list or subset of available printing devices. The server 810 may then, for example, provide and/or transmit an indication of the listing and/or subset to the mobile device 820 (e.g., which according may receive such an indication). In some embodiments, the mobile device 820 (and/or a remote/mobile printing application running thereon; not explicitly shown) may utilize the information from the server 810 to create, populate, update, and/or otherwise present the interface 860. The transmission (and/or other providing of data) from the server 810 may, for example, cause the interface 860 to be displayed on the mobile device 820 (e.g., in accordance with any preferences, rules, criteria, filters, etc. that the user has selected and/or defined).

It should be understood that the above are merely examples of embodiments and should not be interpreted in a limiting fashion. Modifications and alterations to one or more methods described herein could be made without departing from the spirit and scope of the present invention. For example, a printing device could be configured to receive email messages from the remote print server 110 with the documents to be printed as attachments and to cause the printing of any document so attached in accordance with default print instructions, upon recognizing the sender of the email as the remote print server 110.

RULES OF INTERPRETATION

Numerous embodiments have been described, and are presented for illustrative purposes only. The described embodiments are not intended to be limiting in any sense. The invention is widely applicable to numerous embodiments, as is readily apparent from the disclosure herein. These embodiments are described in sufficient detail to enable those skilled in the art to practice the invention, and it is to be understood that other embodiments may be utilized and that structural, logical, software, electrical and other changes may be made without departing from the scope of the present invention. Accordingly, those skilled in the art will recognize that the present invention may be practiced with various modifications and alterations. Although particular features of the present invention may be described with reference to one or more particular embodiments or figures that form a part of the present disclosure, and in which are shown, by way of illustration, specific embodiments of the invention, it should be understood that such features are not limited to usage in the one or more particular embodiments or figures with reference to which they are described. The present disclosure is thus neither a literal description of all embodiments of the invention nor a listing of features of the invention that must be present in all embodiments.

The terms "an embodiment", "embodiment", "embodiments", "the embodiment", "the embodiments", "an embodiment", "some embodiments", "an example embodiment", "at least one embodiment", "one or more embodiments" and "one embodiment" mean "one or more (but not necessarily all) embodiments of the present invention(s)" unless expressly specified otherwise. The terms "including", "comprising" and variations thereof mean "including but not limited to", unless expressly specified otherwise.

The term "consisting of" and variations thereof mean "including and limited to", unless expressly specified otherwise.

The enumerated listing of items does not imply that any or all of the items are mutually exclusive. The enumerated listing of items does not imply that any or all of the items are collectively exhaustive of anything, unless expressly specified otherwise. The enumerated listing of items does not imply that the items are ordered in any manner according to the order in which they are enumerated.

The term "comprising at least one of" followed by a listing of items does not imply that a component or subcomponent from each item in the list is required. Rather, it means that one or more of the items listed may comprise the item specified. For example, if it is said "wherein A comprises at least one of: a, b and c" it is meant that (i) A may comprise a, (ii) A may comprise b, (iii) A may comprise c, (iv) A may comprise a and b, (v) A may comprise a and c, (vi) A may comprise b and c, or (vii) A may comprise a, b and c.

The terms "a", "an" and "the" mean "one or more", unless expressly specified otherwise.

The term "based on" means "based at least on", unless expressly specified otherwise.

The methods described herein (regardless of whether they are referred to as methods, processes, algorithms, calculations, and the like) inherently include one or more steps. Therefore, all references to a "step" or "steps" of such a method have antecedent basis in the mere recitation of the term 'method' or a like term. Accordingly, any reference in a claim to a 'step' or 'steps' of a method is deemed to have sufficient antecedent basis.

Headings of sections provided in this document and the title are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required, or that each of the disclosed components must communicate with every other component. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described in this document does not, in and of itself, indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

It will be readily apparent that the various methods and algorithms described herein may be implemented by, e.g., appropriately programmed general purpose computers and computing devices. Typically a processor (e.g., a microprocessor or controller device) will receive instructions from a memory or like storage device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media may include dynamic random access memory (DRAM), which typically constitutes the main memory. Transmission media may include coaxial cables, copper wire and fiber optics, including the wires or other pathways that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Transmission Control Protocol, Internet Protocol (TCP/IP), Wi-Fi, Bluetooth, TDMA, CDMA, and 3G.

Where databases are described, it will be understood by one of ordinary skill in the art that (i) alternative database structures to those described may be readily employed, and (ii) other memory structures besides databases may be readily employed. Any schematic illustrations and accompanying descriptions of any sample databases presented herein are illustrative arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, other formats (including relational databases, object-based models and/or distributed databases) could be used to store and manipulate the data types described herein. Likewise, object methods or behaviors of a database can be used to implement the processes of the present invention. In addition, the databases may, in a known manner, be stored locally or remotely from a device that accesses data in such a database.

For example, as an example alternative to a database structure for storing information, a hierarchical electronic file folder structure may be used. A program may then be used to access the appropriate information in an appropriate file folder in the hierarchy based on a file path named in the program.

It should also be understood that, to the extent that any term recited in the claims is referred to elsewhere in this document in a manner consistent with a single meaning, that is done for the sake of clarity only, and it is not intended that any such term be so restricted, by implication or otherwise, to that single meaning.

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

CONCLUSION

While various embodiments have been described herein, it should be understood that the scope of the present invention is not limited to the particular embodiments explicitly described. Many other variations and embodiments would be understood by one of ordinary skill in the art upon reading the present description.

What is claimed is:

1. A system for facilitating the remote printing of a document from a computing device that is not connected to a printer directly or via a closed network, comprising:
   a processor; and
   a memory storing a program for directing the processor to perform a method the processor being operable with the program to perform the method, the method comprising:
      receiving, in association with a user identifier uniquely identifying a user and from the computing device, an indication of a device location associated with the user, wherein the device location is not received by the computing device via input from the user;
      determining, based on the location, a subset of available printing devices within a predetermined or user selected proximity to the location;
      providing, via a map-based interface, a graphical representation of the subset of available printing devices within the predetermined or user selected proximity to the location;
      receiving, from a mobile device of the user, a request to print a document, the request including the user identifier;
      receiving from the mobile device a selection of at least one printing device of the subset of available printing devices within the predetermined or user selected proximity to the location, thereby determining a selected printing device;

receiving from the mobile device data comprising the document;

placing the document in a print queue for the selected printing device;

transmitting the document to the selected printing device for printing;

determining, prior to the transmitting, at least one of (i) a printing trigger and (ii) a release trigger, associated with at least one of the document, the user, and the selected printing device;

determining, after the transmitting and in the absence of receiving a print release command from the user, that the at least one of (i) the printing trigger and (ii) the release trigger, is satisfied; and causing, after the determining that the at least one of (i) the printing trigger and (ii) the release trigger, is satisfied, the selected printing device to print or release the document.

2. The system of claim 1, wherein the method further comprises:

standardizing the document upon its receipt from the mobile device and storing it in the print queue in standardized form, wherein the standardizing comprises converting the document from an original document type to standardized document type.

3. The system of claim 1, wherein the method further comprises:

encrypting the document upon its receipt from the mobile device and storing it in the print queue in encrypted form.

4. The system of claim 3, wherein transmitting the document to the printing device for printing comprises transmitting the encrypted document to the printing device.

5. The system of claim 1, wherein receiving from the mobile device data comprising the document comprises receiving from the mobile device an encrypted form of the document, the document having been encrypted by the mobile device.

6. The system of claim 1, wherein receiving from the mobile device the request to print the document includes receiving from the mobile device a unique document identifier uniquely identifying the document.

7. The system of claim 6, wherein receiving from the mobile device data comprising the document comprises receiving from the mobile device an e-mail including the document, the e-mail including the unique document identifier.

8. The system of claim 1, wherein receiving from the mobile device data comprising the document comprises receiving an upload of the document via an Internet protocol.

9. The system of claim 1, wherein the method further comprises:

receiving from the mobile device at least one print instruction in accordance with which the document is to be printed;

storing the at least one print instruction in association with the document in the print queue of the selected printing device; and transmitting an indication of the at least one print instruction to the selected printing device along with the document.

10. The system of claim 1, wherein the method further comprises:

causing installation on the printing device software which allows the printing device to open and print documents in file formats for which the printing device does not include a native application.

11. The system of claim 1, wherein the printing trigger comprises an instruction that the document be printed once the user is determined to be within a predetermined distance from a location of the printing device.

12. The system of claim 1, wherein the printing trigger comprises an instruction that the document be printed once the mobile device is determined to be within a predetermined proximity of a location of the printing device.

13. The system of claim 1, wherein the release trigger comprises an instruction that the printed document be released to the user once the user is determined to be within a predetermined distance from a location of the printing device.

14. The system of claim 1, wherein the release trigger comprises an instruction that the printed document be released to the user once the mobile device is determined to be within a predetermined proximity of a location of the printing device.

15. A method for facilitating the remote printing of a document from a computing device that is not connected to a printer directly or via a closed network, comprising:

receiving, by a server device and in association with a user identifier uniquely identifying a user and from the computing device, an indication of device location associated with the user, wherein the device location is not received by the computing device via input from the user;

determining, by the server device and based on the location, a subset of available printing devices within a predetermined proximity to the location;

providing, by the server device and via a map-based interface, a graphical representation of the subset of available printing devices within the predetermined proximity to the location;

receiving, by the server device and from a mobile device of the user, a request to print a document, the request including the user identifier;

receiving by the server device and from the mobile device, a selection of at least one printing device of the subset of available printing devices within the predetermined proximity to the location, thereby determining a selected printing device;

receiving, by the server device and from the mobile device, data comprising the document;

placing, by the server device, the document in a print queue for the selected printing device;

transmitting, by the server device, the document to the selected printing device for printing;

determining, by the server device, at least one of (i) a printing trigger and (ii) a release trigger, associated with at least one of the document, the user, and the selected printing device, wherein the at least one of (i) the printing trigger and (ii) the release trigger comprises at least one of: (a) an instruction that the document be printed once the user is determined to be within a predetermined distance from a location of the printing device; (b) an instruction that the document be printed once the mobile device is determined to be within a predetermined proximity of a location of the printing device; (c) an instruction that the printed document be released to the user once the user is determined to be within a predetermined distance from a location of the printing device; and (d) an instruction that the printed document be released to the user once the mobile device is determined to be within a predetermined proximity of a location of the printing device; and causing, by the server device, the selected printing device to print or release the document in accordance with the printing or release trigger.

16. A non-transitory computer-readable medium storing instructions that when executed by a processing device result in:

receiving, in association with a user identifier uniquely identifying a user, an indication of device location associated with the user;

determining, based on the location, a subset of available printing devices within a predetermined proximity to the location;

providing, via a map-based interface, a graphical representation of the subset of available printing devices within the predetermined proximity to the location;

receiving, from a mobile device of the user, a request to print a document, the request including the user identifier;

receiving from the mobile device a selection of at least one printing device of the subset of available printing devices within the predetermined proximity to the location, thereby determining a selected printing device;

receiving from the mobile device data comprising the document;

placing the document in a print queue for the selected printing device;

transmitting the document to the selected printing device for printing;

determining prior to the transmitting, at least one of (i) a printing trigger and (ii) a release trigger, associated with at least one of the document, the user, and the selected printing device;

determining, after the transmitting and in the absence of receiving a print release command from the user, that the at least one of (i) the printing trigger and (ii) the release trigger, is satisfied; and causing, after the determining that the at least one of (i) the printing trigger and (ii) the release trigger, is satisfied, the selected printing device to print or release the document.

* * * * *